(12) United States Patent
Fujishiro et al.

(10) Patent No.: US 8,289,166 B2
(45) Date of Patent: Oct. 16, 2012

(54) COMMUNICATION APPARATUS, COMMUNICATION SYSTEM, AND POWER CONTROL METHOD

(75) Inventors: Koichi Fujishiro, Inagi (JP); Mitsuo Watanabe, Inagi (JP); Hiroshi Kawamata, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 535 days.

(21) Appl. No.: 12/572,790

(22) Filed: Oct. 2, 2009

(65) Prior Publication Data

US 2010/0134293 A1    Jun. 3, 2010

(30) Foreign Application Priority Data

Nov. 28, 2008  (JP) ................................ 2008-304065

(51) Int. Cl.
*G08B 13/14* (2006.01)
(52) U.S. Cl. .............. 340/572.7; 340/539.11; 340/10.51
(58) Field of Classification Search ............... 340/572.7, 340/568.1, 8.1, 10.51, 572.1–572.6, 572.8–572.9, 340/10.1, 539.11
See application file for complete search history.

(56) References Cited

U.S. PATENT DOCUMENTS

| 7,570,164 | B2 * | 8/2009 | Chakraborty et al. ...... 340/572.1 |
| 2005/0234778 | A1 * | 10/2005 | Sperduti et al. ................ 705/22 |
| 2006/0054708 | A1 * | 3/2006 | Koo et al. ..................... 235/492 |
| 2009/0267736 | A1 | 10/2009 | Watanabe et al. |

FOREIGN PATENT DOCUMENTS

| JP | 09-305965 A | 11/1997 |
| JP | 11-144150 A | 5/1999 |
| JP | 2002-247157 A | 8/2002 |
| JP | 2004-046904 A | 2/2004 |
| JP | 2005-157986 A | 6/2005 |
| JP | 2005-190119 A | 7/2005 |
| JP | 2006-048094 A | 2/2006 |
| JP | 2006-172040 A | 6/2006 |
| JP | 2006-211050 A | 8/2006 |
| JP | 2006-318191 A | 11/2006 |
| JP | 2006-350990 A | 12/2006 |
| JP | 2007-096940 A | 4/2007 |
| JP | 2008-086196 A | 4/2008 |
| JP | 2009-009319 A | 1/2009 |

OTHER PUBLICATIONS

Japanese Patent Office Action issued on Sep. 4, 2012 in Japanese Patent Application No. 2008-304065.

* cited by examiner

*Primary Examiner* — Daniel Previl
(74) *Attorney, Agent, or Firm* — Westerman, Hattori, Daniels & Adrian, LLP

(57) ABSTRACT

A communication apparatus includes a first RF tag which performs communication using electromagnetic waves in a first frequency band; a second RF tag which performs communication using electromagnetic waves in a second frequency band different from those in the first frequency band; a storage unit having a shared area accessible from the respective RF tags; and a power controller which generates power for driving the first RF tag and the storage unit using the first frequency band electromagnetic waves and supplies the generated power to the first RF tag and the storage unit, and which generates power for driving the second RF tag and the storage unit using the second frequency band electromagnetic waves and supplies the generated power to the second RF tag and the storage unit.

10 Claims, 22 Drawing Sheets

COMMUNICATION APPARATUS, COMMUNICATION SYSTEM, AND POWER CONTROL METHOD

CROSS-REFERENCE TO RELATED APPLICATIONS

This application is based upon and claims the benefit of priority of the prior Japanese Patent Application No. 2008-304065, filed on Nov. 28, 2008, the entire contents of which are incorporated herein by reference.

FIELD

The embodiments discussed herein are related to a communication apparatus, a communication system, and a power control method.

BACKGROUND

In recent years, a communication system using RFID technology has been widely used. In this communication system, a reading/writing device (hereinafter, simply referred to as a tag reader) and an RF (Radio Frequency) tag perform radio communication. The RF tag includes a small IC (Integrated Circuit) chip. The IC chip stores individual identification information and a predetermined arithmetic processing function, thereby enabling management of each individual attached with an RF tag and management of various data sets associated with the respective individuals. Examples of the communication system using the RF tag include an article management system that manages goods in stock or fixtures and a railway ticket examining system.

Here, a power supply method for the RF tag includes a method for an active RF tag and that for a passive RF tag. The active RF tag is driven by an internal power supply. The passive RF tag is driven by a power supply from a tag reader.

For the power supply to the passive RF tag, the following methods are used. One method is to use an electromagnetic induction effect caused by magnetically coupling one coil antenna on the tag reader side and another coil antenna on the RF tag side. Another method uses a received power of electromagnetic waves from the tag reader. These power supply methods are properly used depending on frequency bands used for communication. For example, the power supply method using the electromagnetic induction is employed by an RF tag that performs communication using frequencies in the High Frequency (HF) band. Meanwhile, the power supply method using the received power of electromagnetic waves is employed by an RF tag that performs communication using frequencies in the Ultra High Frequency (UHF) band.

Incidentally, various methods have been proposed for the communication system using the RFID technology. One method is to attach an RF tag to a mobile communication system (see, e.g., Japanese Laid-open Patent Publication No. 2002-247157). Another method is to make it possible to integrate a plurality of RF tags having different functions (see, e.g., Japanese Laid-open Patent Publication Nos. 2006-048094 and 2006-172040). These methods may realize an advanced communication system. Particularly, a method for integrating two RF tags having different applications to enable data sharing may provide more convenient services (see, e.g., Japanese Laid-open Patent Publication No. 2004-046904).

However, the method described in the Japanese Laid-open Patent Publication No. 2004-046904 gives no consideration to a data sharing method performed when integrating a plurality of passive RF tags each performing communication using electromagnetic waves in different frequency bands (e.g., the HF band and the UHF band). When the frequency bands used by the respective passive RF tags are different such as the HF band and the UHF band, the power supply methods for the respective passive RF tags are different as described above. In short, when using the RF tags in combination, the RF tags are driven by independent power supplies. Therefore, this method has difficulty in providing areas enabling data sharing between the respective RF tags.

SUMMARY

According to one aspect of the present invention, there is provided a communication apparatus. This communication apparatus includes: a first RF tag which performs communication using electromagnetic waves in a first frequency band; a second RF tag which performs communication using electromagnetic waves in a second frequency band different from those in the first frequency band; a storage unit having a shared area accessible from the first and second RF tags; and a power controller which generates power for driving the first RF tag and the storage unit using the first frequency band electromagnetic waves and supplies the generated power to the first RF tag and the storage unit, and which generates power for driving the second RF tag and the storage unit using the second frequency band electromagnetic waves and supplies the generated power to the second RF tag and the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 outlines a communication apparatus according to the present embodiment;

FIG. 3A illustrates a perspective view of the IC-equipped basket, and FIG. 3B illustrates a top view of the IC-equipped basket viewed from the "a" direction in FIG. 3A;

FIG. 19A illustrates a side view of the IC-equipped basket, and FIG. 19B illustrates a front view of the IC-equipped basket;

FIG. 20A illustrates a perspective view of the set tray, and FIG. 20B illustrates a side view of the set tray viewed from the "b" direction in FIG. 20A;

DESCRIPTION OF EMBODIMENT(S)

Figure 1:
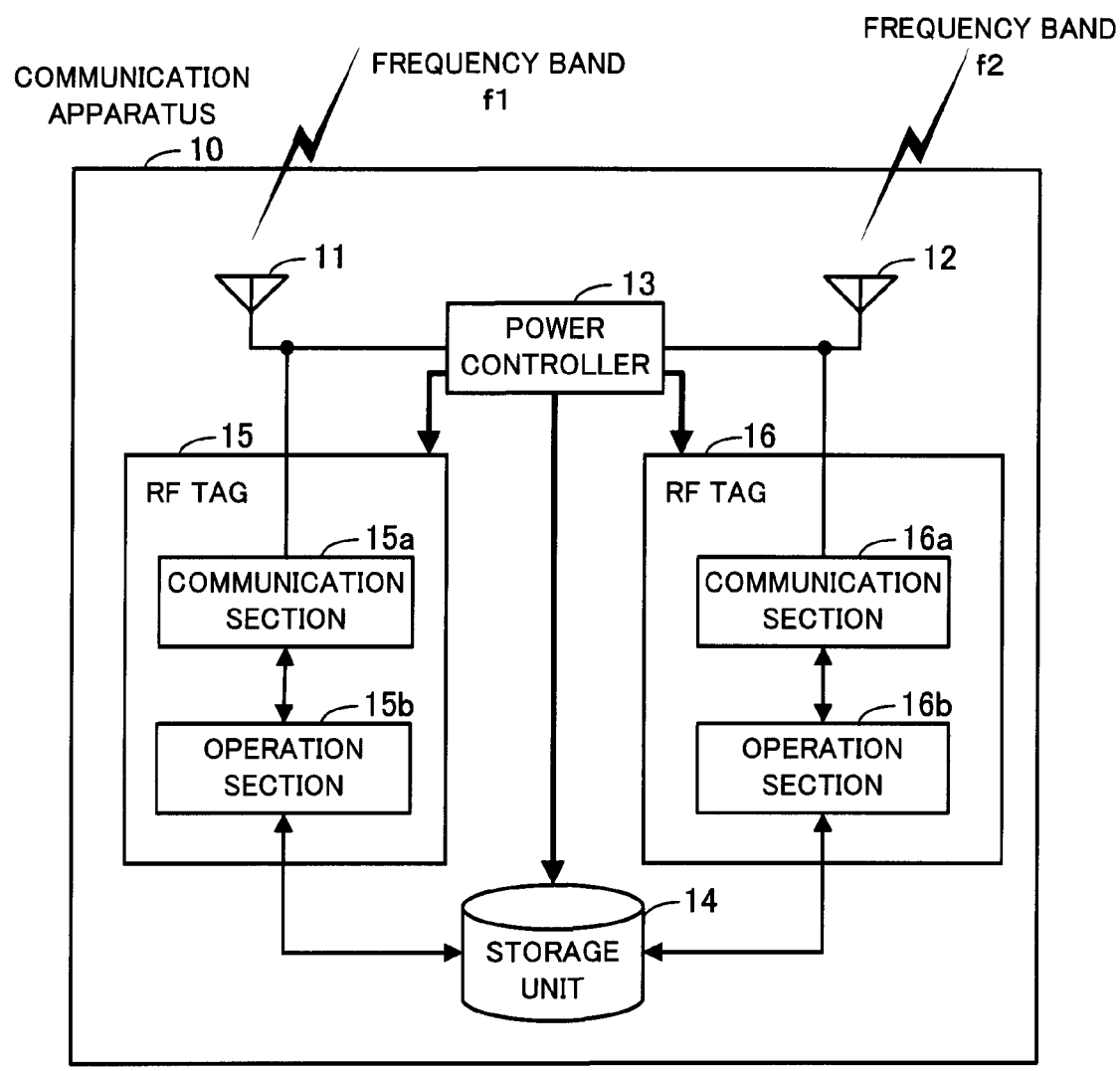

Embodiments of the present invention will be described in detail below with reference to the accompanying drawings, wherein like reference numerals refer to like elements throughout.

FIG. 1 outlines a communication apparatus according to the present embodiment. A communication apparatus 10 has passive RF tags, and is driven by a power supply using an effect of electromagnetic induction with another communication apparatus (e.g., a tag reader) or using a received power of electromagnetic waves from another communication apparatus.

The communication apparatus 10 has antennas 11 and 12, a power controller 13, a storage unit 14, and RF tags 15 and 16.

The antenna 11 is an antenna for transmitting and receiving electromagnetic waves in a frequency band f1 (e.g., UHF band). The antenna 11 supplies to the RF tag 15 a received signal contained in electromagnetic waves received from another communication apparatus. Further, the antenna 11 transmits to another communication apparatus a transmission signal obtained from the RF tag 15.

The antenna 12 is an antenna for transmitting and receiving electromagnetic waves in a frequency band f2 (e.g., HF band) different from those in the frequency band f1. The antenna 12 supplies to the RF tag 16 a received signal contained in electromagnetic waves received from another communication apparatus. Further, the antenna 12 transmits to another communication apparatus a transmission signal obtained from the RF tag 16.

The power controller 13 generates power for driving the RF tag 15 and the storage unit 14 using the electromagnetic waves received by the antenna 11 and supplies the power to the RF tag 15 and the storage unit 14. For example, when the antenna 11 performs communication using electromagnetic waves in the UHF band, the power controller 13 generates power for driving the RF tag 15 and the storage unit 14 using the received power of the electromagnetic waves. Further, the power controller generates power for driving the RF tag 16 and the storage unit 14 using the electromagnetic waves received by the antenna 12 and supplies the power to the RF tag 16 and the storage unit 14. For example, when the antenna 12 performs communication using electromagnetic waves in the HF band, the power controller 13 generates power for driving the RF tag 16 and the storage unit 14 using the power obtained by electromagnetic induction. When performing power supply using electromagnetic induction, the antenna is formed into a coil shape.

The storage unit 14 has a shared area accessible from the RF tags 15 and 16. The storage unit 14 is driven by the power supplied from the power controller 13.

The RF tag 15 performs arithmetic processing based on information (processing request) contained in signals received by the antenna 11, and transmits the result of the processing back to another communication apparatus via the antenna 11. The RF tag 15 has a communication section 15a and an operation section 15b.

The communication section 15a frequency-converts a received signal from the antenna 11 into a baseband signal. Thereafter, the communication section 15a performs predetermined demodulation processing on the baseband signal to obtain information contained in the baseband signal. The communication section 15a outputs the obtained information to the operation section 15b. Further, the communication section 15a modulates a processing response message from the operation section 15b to a baseband signal. Thereafter, the communication section 15a frequency-converts the modulated signal into an RF band transmission signal and outputs the RF band transmission signal to the antenna 11.

The operation section 15b performs arithmetic processing based on the information obtained from the communication section 15a. At this time, the operation section 15b can access shared information stored in the storage unit 14, if desired. For example, the operation section 15b performs the arithmetic processing based on the shared information and outputs the result of the processing to the communication section 15a.

The RF tag 16 performs arithmetic processing based on information (processing request) contained in signals received by the antenna 12, and transmits the result of the processing back to another communication apparatus via the antenna 12. The RF tag 16 has a communication section 16a and an operation section 16b.

The communication section 16a frequency-converts a received signal contained in RF band (e.g., HF band) electromagnetic waves supplied from the antenna 12 into a baseband signal. Thereafter, the communication section 16a performs predetermined demodulation processing on the baseband signal to obtain information contained in the baseband signal. The communication section 16a outputs the obtained information to the operation section 16b. Further, the communication section 16a modulates a processing response message from the operation section 16b to a baseband signal. Thereafter, the communication section 16a frequency-converts the modulated signal into an RF band transmission signal and outputs the RF band transmission signal to the antenna 12.

The operation section 16b performs arithmetic processing based on the information obtained from the communication section 16a. At this time, the operation section 16b accesses shared information stored in the storage unit 14, if desired. For example, the operation section 16b performs the arithmetic processing based on the shared information and outputs the result of the processing to the communication section 16a.

According to the above-described communication apparatus 10, when performing communication using the electromagnetic waves in the frequency band f1, the power controller 13 generates power for driving the RF tag 15 and the storage unit 14 using a power supply from the antenna 11 and supplies the generated power to the RF tag 15 and the storage unit 14. When performing communication using the electromagnetic waves in the frequency band f2, the power controller 13 generates power for driving the RF tag 16 and the storage unit 14 using a power supply from the antenna 12, and supplies the generated power to the RF tag 16 and the storage unit 14.

Thus, even when several RF tags each performing communication using different frequency bands are used in combination, data can be shared among the respective RF tags. Specifically, several RF tags each performing communication using different frequency bands can be properly used according to applications, and at the same time, common data can be used among the RF tags. As a result, more convenient services can be provided.

Each of the RF tags 15 and 16 may be provided with a storage unit for storing data exclusively used by each of the RF tags 15 and 16, if desired, in addition to the above-described configuration. By this configuration, common information used by the RF tags 15 and 16 as well as information independently used by the RF tags 15 and 16 can be stored. Each of the RF tags 15 and 16 performs communication using electromagnetic waves in different frequency bands. Therefore, physical independency of each communication path can be secured, so that security for the information used by each of the RF tags 15 and 16 can be improved.

The communication apparatus 10 can be used for services provided by a self checkout (SCO: Self Checkout) system (hereinafter, referred to as an SCO system) used, for example, in a supermarket or shopping center. The SCO system is a system for allowing a customer to settle accounts for commodities by an operation of the customer itself without intervention of store clerks. By taking as an example a case of applying the communication apparatus 10 to the SCO system, a specific application example will be described hereinafter in more detail.

Figure 2:
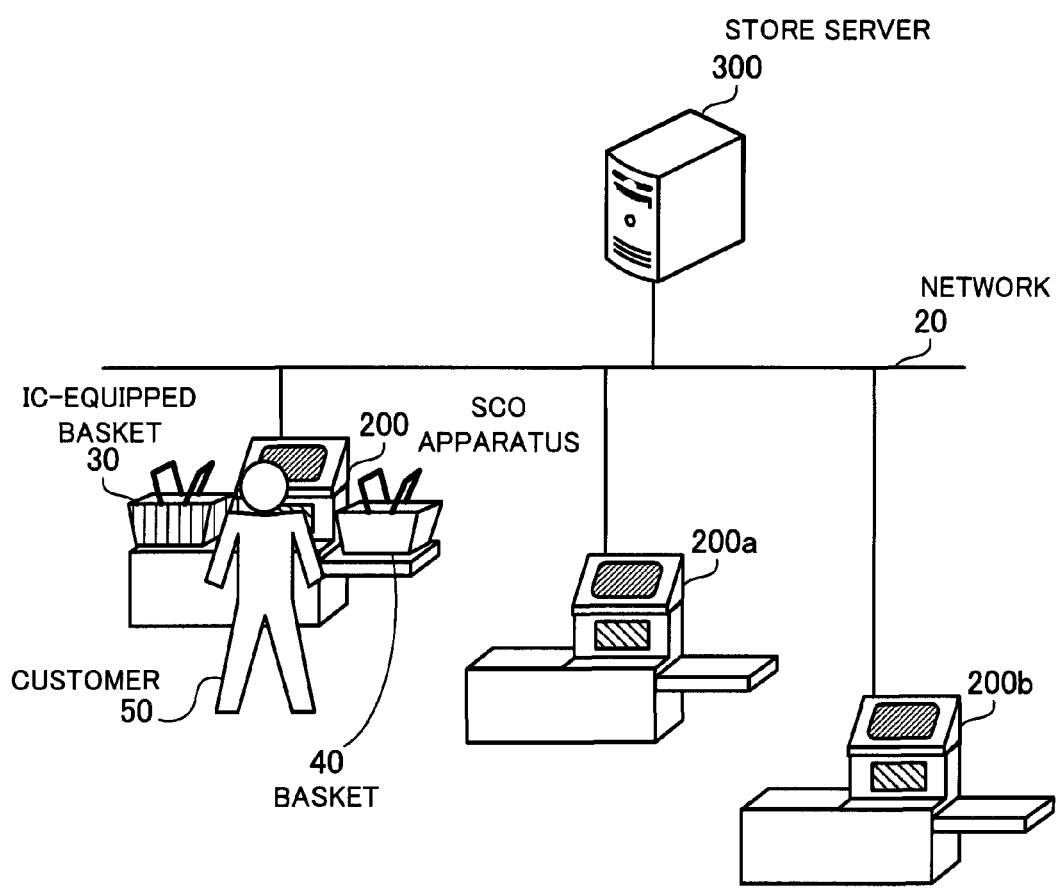
FIG. 2 illustrates a system configuration of an SCO system.

FIG. 2 illustrates a system configuration of the SCO system. In this SCO system, SCO apparatuses 200, 200a, and 200b, and a store server 300 are interconnected via a network 20.

The SCO apparatuses 200, 200a, and 200b are information processors that allow a customer to settle accounts for commodities by an operation of the customer itself. The SCO apparatuses 200, 200a, and 200b respectively read a commodity barcode presented at a predetermined position by a customer, obtain a price of the commodity in cooperation with the store server 300, and display the price to the customer. Further, the SCO apparatuses 200, 200a, and 200b respectively transmit sales information about each commodity to the store server 300.

The store server 300 manages a commodity master for registering the commodity price and weight, or manages customer information. The store server 300 appropriately receives inquiries about these information units from the SCO apparatuses 200, 200a, and 200b, and transmits these information units back to the SCO apparatuses 200, 200a, and 200b.

A POS (Point Of Sale) terminal (not shown) installed at a normal human cash register or a clerk terminal (not shown) for monitoring the respective SCO apparatuses 200, 200a, and 200b may be connected to the network 20.

This SCO system uses an IC-equipped basket mounted with an IC card having two RF tags. The IC-equipped basket is possessed by each customer to allow a customer to transport purchased commodities home while accommodating the commodities in the IC-equipped basket without using a plastic bag distributed at a store. Therefore, this system contributes to reduction in the use of plastic bags and promotion of environmental protection.

Here, a procedure for commodity purchase using the IC-equipped basket will be simply described.

A customer 50 has an IC-equipped basket 30. The customer 50 carries the IC-equipped basket 30 to a store, walks around in the store while mounting a basket 40 of the store on the IC-equipped basket 30, and puts desired commodities into the basket 40. Next, the customer 50 places, when settling accounts for the commodities using the SCO apparatus 200, the IC-equipped basket 30 on a predetermined table. Then, the customer 50 registers in the SCO apparatus 200 the commodities put into the basket 40, and sequentially puts the registered commodities into the IC-equipped basket 30. The customer 50 settles accounts using the SCO apparatus 200 when completing the registration of all the commodities and then, transports the purchased commodities with the IC-equipped basket 30 home. Thus, the customer 50 is allowed to transport the purchased commodities home without using plastic bags.

For attaining reduction in the use of plastic bags, this SCO system encourages each customer to use the IC-equipped basket and provides more convenient services. Specific examples of the services include (1) a service that automatically determines the use by each customer of the IC-equipped basket to give each customer a point based on the use of the IC-equipped basket and (2) a service that allows a simple and easy settlement using electronic money charged in an IC card equipped in the IC-equipped basket.

A configuration of each device in the SCO system that provides the above-described services will be hereinafter described. While the following description exemplifies the SCO apparatus 200, the same concept is also applied to the SCO apparatuses 200a and 200b.

Figure 3A:
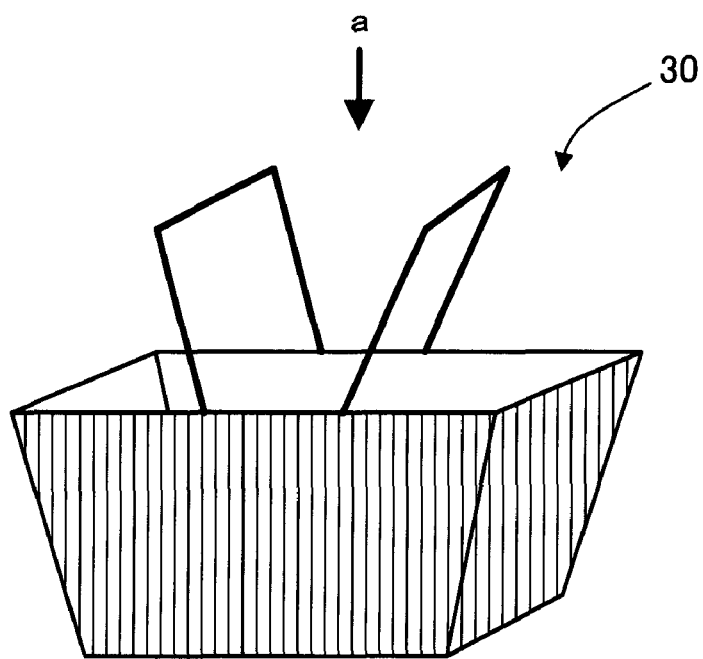
FIGS. 3A and 3B illustrate an IC-equipped basket.
Figure 3B:
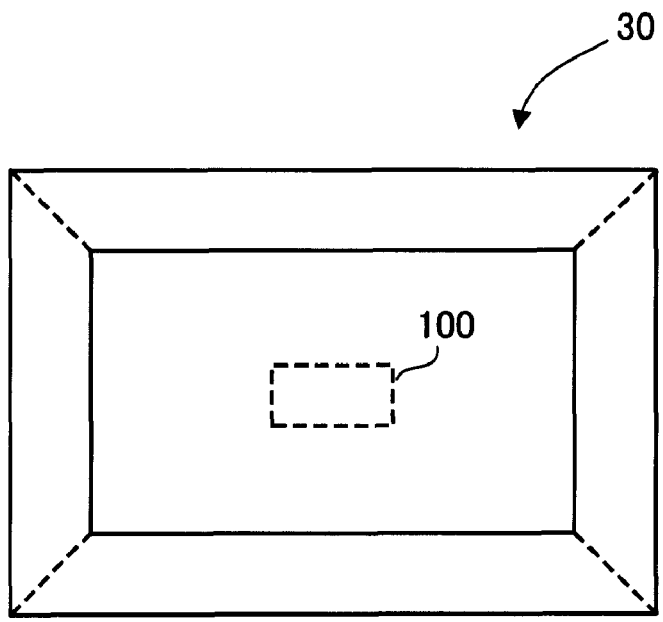

FIGS. 3A and 3B illustrate the IC-equipped basket 30. FIG. 3A illustrates a perspective view of an IC-equipped basket 30, and FIG. 3B illustrates a top view of the IC-equipped basket 30 viewed from the "a" direction in FIG. 3A. The IC-equipped basket 30 has an IC card 100 within and at the center of the bottom surface thereof. The IC card 100 functions as a communication apparatus having two RF tags. FIG. 3B illustrates a set position of the IC card 100 at the center part of the bottom surface of the IC-equipped basket 30 (the IC card 100 is actually invisible because of being equipped within the bottom surface).

Figure 4:
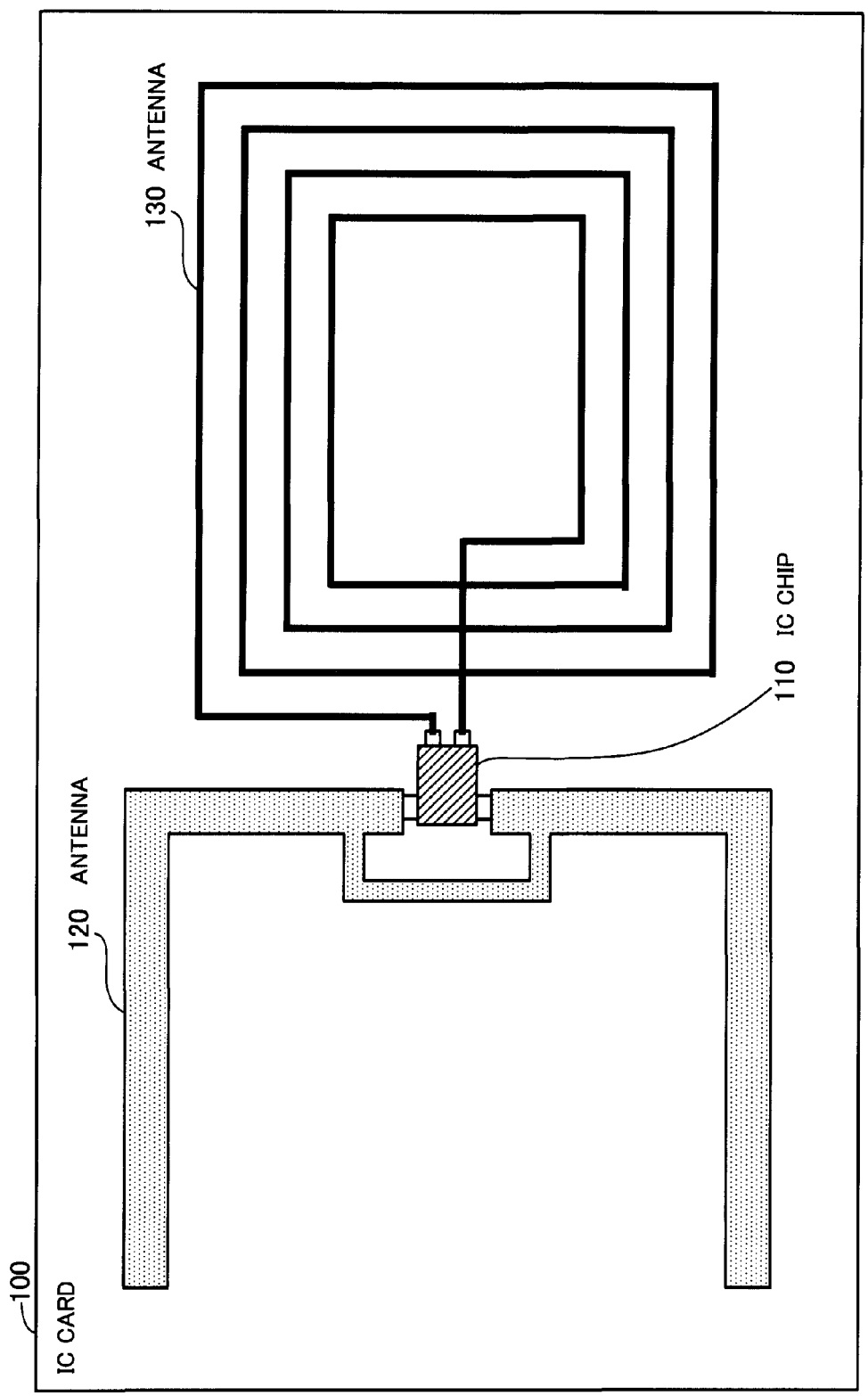
FIG. 4 illustrates a first configuration example of an IC card.

FIG. 4 illustrates a first configuration example of the IC card 100. The IC card 100 has an IC chip 110, and antennas 120 and 130.

The IC chip 110 contains two RF tags. One RF tag performs communication using electromagnetic waves in the UHF band (e.g., 950 MHz). Meanwhile, the other RF tag performs communication using electromagnetic waves in the HF band (e.g., 13.56 MHz).

The antenna 120 is a dipole antenna for transmitting and receiving the UHF band electromagnetic waves to and from a tag reader of the SCO apparatus 200.

The antenna 130 is a coil antenna for transmitting and receiving the HF band electromagnetic waves to and from a tag reader of the SCO apparatus 200.

In the first configuration example, the IC chip 110 is disposed at the center of the surface of the IC card 100. The antennas 120 and 130 are disposed in both side areas sandwiching the IC chip 110 in the longitudinal direction of the IC card 100.

The IC card 100 is formed into a card shape by sealing the IC chip 110 and the antennas 120 and 130 with plastic resin such as polyethylene terephthalate (PET: PolyEthylene Terephthalate). The IC card 100 may be formed to have the same size and thickness as those of, for example, a cash card or a credit card.

In the IC card 100, a communicable distance of the communication using each of the UHF band and the HF band is adjusted to a suitable distance according to the operation of this communication system. For this purpose, for example, the IC card 100 is covered with dielectric. A dielectric constant of the dielectric is selected such that a communicable distance of the communication using each frequency band is adjusted to a suitable distance by impedance matching. A specific configuration will be described in detail with reference to FIGS. 19 to 22.

Figure 5:
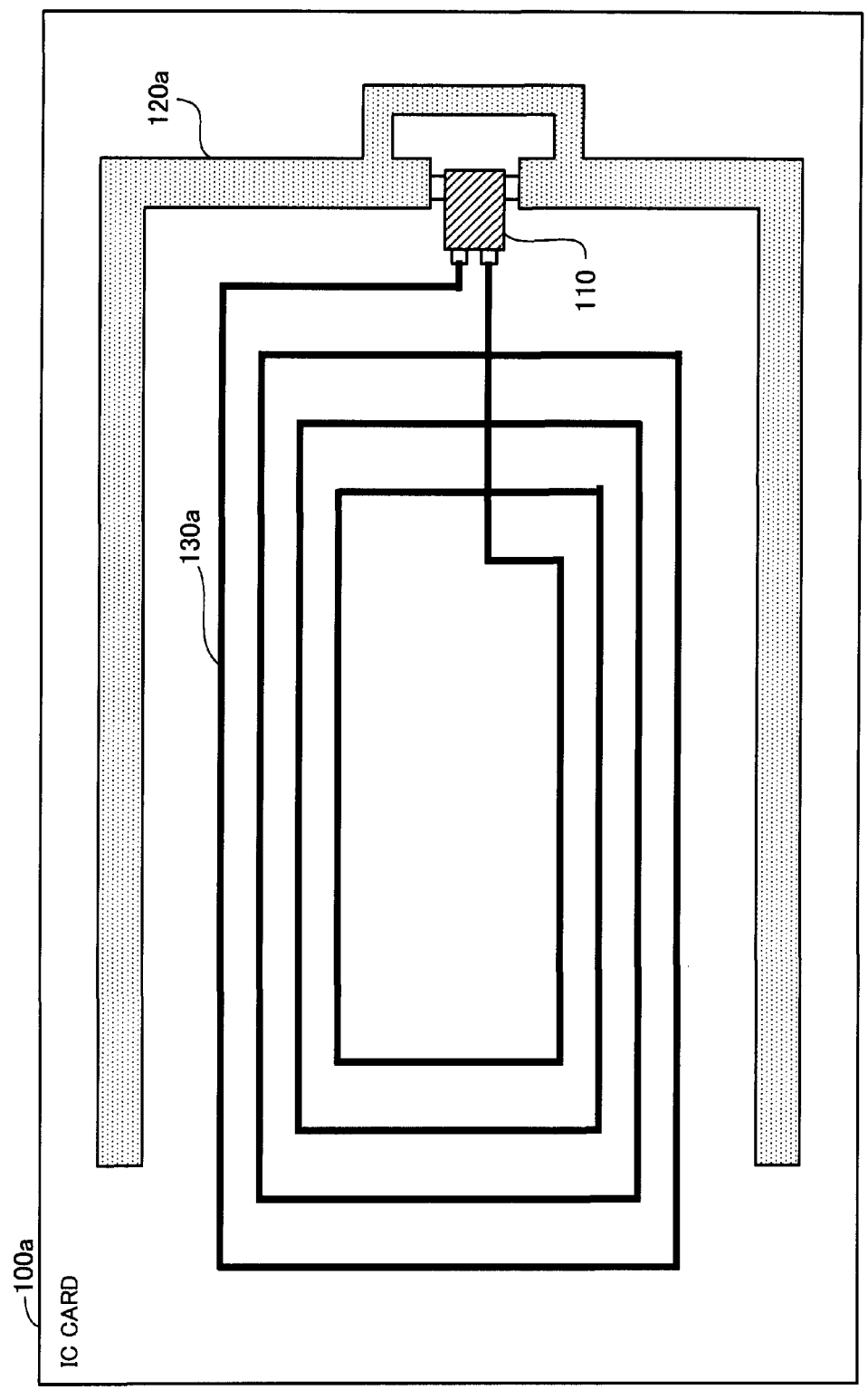
FIG. 5 illustrates a second configuration example of an IC card.

FIG. 5 illustrates a second configuration example of the IC card. An IC card 100a has the IC chip 110, and antennas 120a and 130a.

The IC chip 110 has the same configuration as that illustrated using the same symbol in FIG. 4.

The antenna 120a corresponds to the antenna 120 in FIG. 4.
The antenna 130a corresponds to the antenna 130 in FIG. 4.

In the second configuration example, the IC chip 110 is disposed on one base end of the IC card 100a. The antennas 120a and 130a are disposed in an area (an area defined as the left side of the IC chip 110 with respect to the drawing of FIG. 5) where the antennas 12a and 130a lie in the same direction with respect to the IC chip 110 in the longitudinal direction of the IC card 100a.

The IC card 100a is formed into a card shape using plastic resin such as PET in the same manner as in the IC card 100. The IC card 100a is covered with dielectric having a predetermined dielectric constant such that a communicable distance of the communication using the UHF band is adjusted to a suitable distance.

While the following description assumes as a configuration of the IC card the IC card 100 illustrated in FIG. 4, the same concept can also be applied to the IC card 100a illustrated in FIG. 5.

In the following description, the RF tag that performs communication using the UHF band electromagnetic waves and the RF tag that performs communication using the HF band electromagnetic waves are respectively referred to as an RFID tag and an IC tag for convenience of distinguishing names. The RFID tag is used to realize the above-described service that automatically determines the use of the IC-equipped basket. Therefore, the RFID tag to be used is a simple RF tag that handles only information (identification information) for determining the use of the IC-equipped basket 30. Accordingly, the RFID tag requires a smaller amount of built-in memory, and has a restricted arithmetic processing function. The IC tag is used to realize the above-described service that allows electronic settlement. Therefore, the IC tag to be used is a RF tag having a predetermined arithmetic processing function or security function, such as a conventionally used contact-free IC card, to perform settlement of accounts by electronic money. A configuration of the IC chip 110 of the IC card 100 will be hereinafter described.

Figure 6:
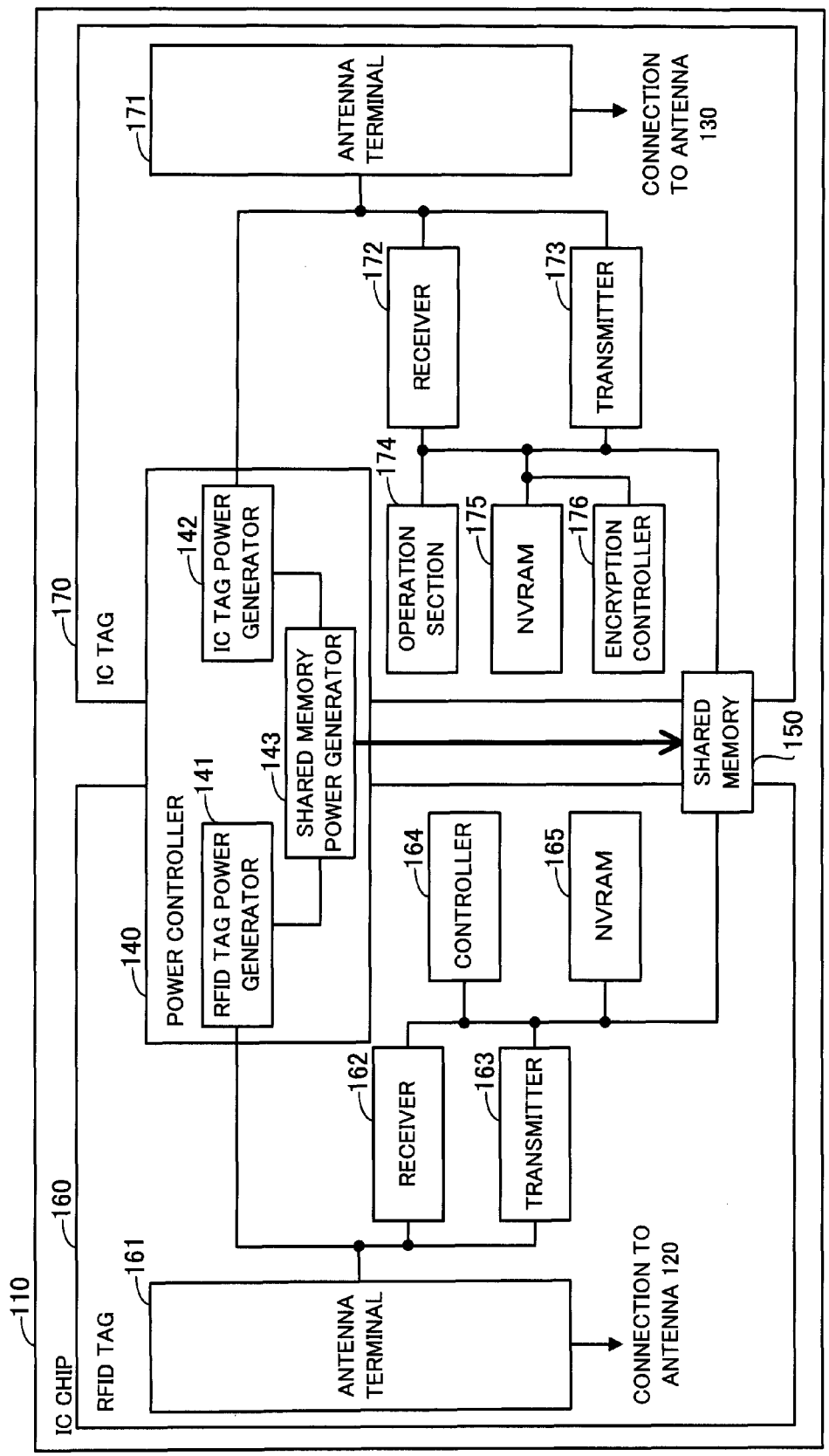
FIG. 6 illustrates a hardware configuration of an IC chip.

FIG. 6 illustrates a hardware configuration of the IC chip 100. The IC chip 110 has a power controller 140, a shared memory 150, an RFID tag 160, and an IC tag 170.

The power controller 140 generates power for driving the shared memory 150, the RFID tag 160, and the IC tag 170. Specifically, the power controller 140 has an RFID tag power generator 141, an IC tag power generator 142, and a shared memory power generator 143.

The RFID tag power generator 141 generates power for driving the RFID tag 160 using a received power of electromagnetic waves transmitted from the SCO apparatus 200 via the antenna 120 connected to the RFID tag 160, and supplies the power to each section of the RFID tag 160.

The IC tag power generator 142 generates power for driving the IC tag 170 using power induced by electromagnetic induction via the antenna 130 connected to the IC tag 170, and supplies the power to each section of the IC tag 170.

The shared memory power generator 143 generates power for driving the shared memory 150 using power generated by the RFID tag power generator 141 or that generated by the IC tag power generator 142, and supplies the power to the shared memory 150.

The shared memory 150 has a shared memory area accessible from the RFID tag 160 and the IC tag 170. This memory area stores information for identifying the IC-equipped basket 30.

The RFID tag 160 handles information for identifying the IC-equipped basket 30. The RFID tag 160 is driven by power supplied from the RFID tag power generator 141. The RFID tag 160 has an antenna terminal 161, a receiver 162, a transmitter 163, a controller 164, and an NVRAM (Non Versatile Random Access Memory) 165.

The antenna terminal 161 is connected to the antenna 120. The antenna terminal 161 supplies to the RFID tag power generator 141 and the receiver 162 a received signal from the antenna 120. Further, the antenna terminal 161 outputs a transmission signal obtained from the transmitter 163 to the antenna 120.

The receiver 162 frequency-converts a UHF band received signal from the antenna terminal 161. Thereafter, the receiver 162 performs demodulation processing on the received signal to extract a processing request contained in the received signal. The receiver 162 outputs the extracted processing request to the controller 164.

The transmitter 163 modulates a processing result from the controller 164. Thereafter, the transmitter 163 frequency-converts the modulated processing result into a UHF band transmission signal and outputs the UHF band transmission signal to the antenna terminal 161.

The controller 164 performs processing according to a processing request from the receiver 162 and outputs the processing result to the transmitter 163. The controller 164 accesses the shared memory 150 according to need, and reads information stored in the shared memory 150.

The NVRAM 165 is a nonvolatile memory for storing programs necessary for processing performed by the controller 164 or data handled by the RFID tag 160.

The IC tag 170 handles management information on electronic money. The IC tag 170 is driven by power supplied from the IC tag power generator 142. The IC tag 170 has an antenna terminal 171, a receiver 172, a transmitter 173, an operation section 174, an NVRAM 175, and an encryption controller 176.

The antenna terminal 171 is connected to the antenna 130. The antenna terminal 171 supplies a received signal from the antenna 130 to the IC tag power generator 142 and the receiver 172.

The receiver 172 frequency-converts an HF band received signal from the antenna terminal 171. Thereafter, the receiver 172 performs demodulation processing on the received signal to extract a processing request contained in the received signal. The receiver 172 outputs the extracted processing request to the operation section 174.

The transmitter 173 modulates a processing result from the operation section 174. Thereafter, the transmitter 173 frequency-converts the modulated processing result into a HF band transmission signal and outputs the HF band transmission signal to the antenna terminal 171.

The operation section 174 performs arithmetic processing according to a processing request from the receiver 172 and stores the arithmetic processing result in the NVRAM 175 or outputs the arithmetic processing result to the transmitter 173. The operation section 174 accesses the shared memory 150 according to need, and reads information stored in the shared memory 150.

The NVRAM 175 is a nonvolatile memory for storing programs necessary for processing in the operation section 174 or data handled by the IC tag 170. The NVRAM 175 stores management information on electronic money.

The encryption controller 176 encrypts/decrypts data stored in the NVRAM 175, if desired.

Figure 7:
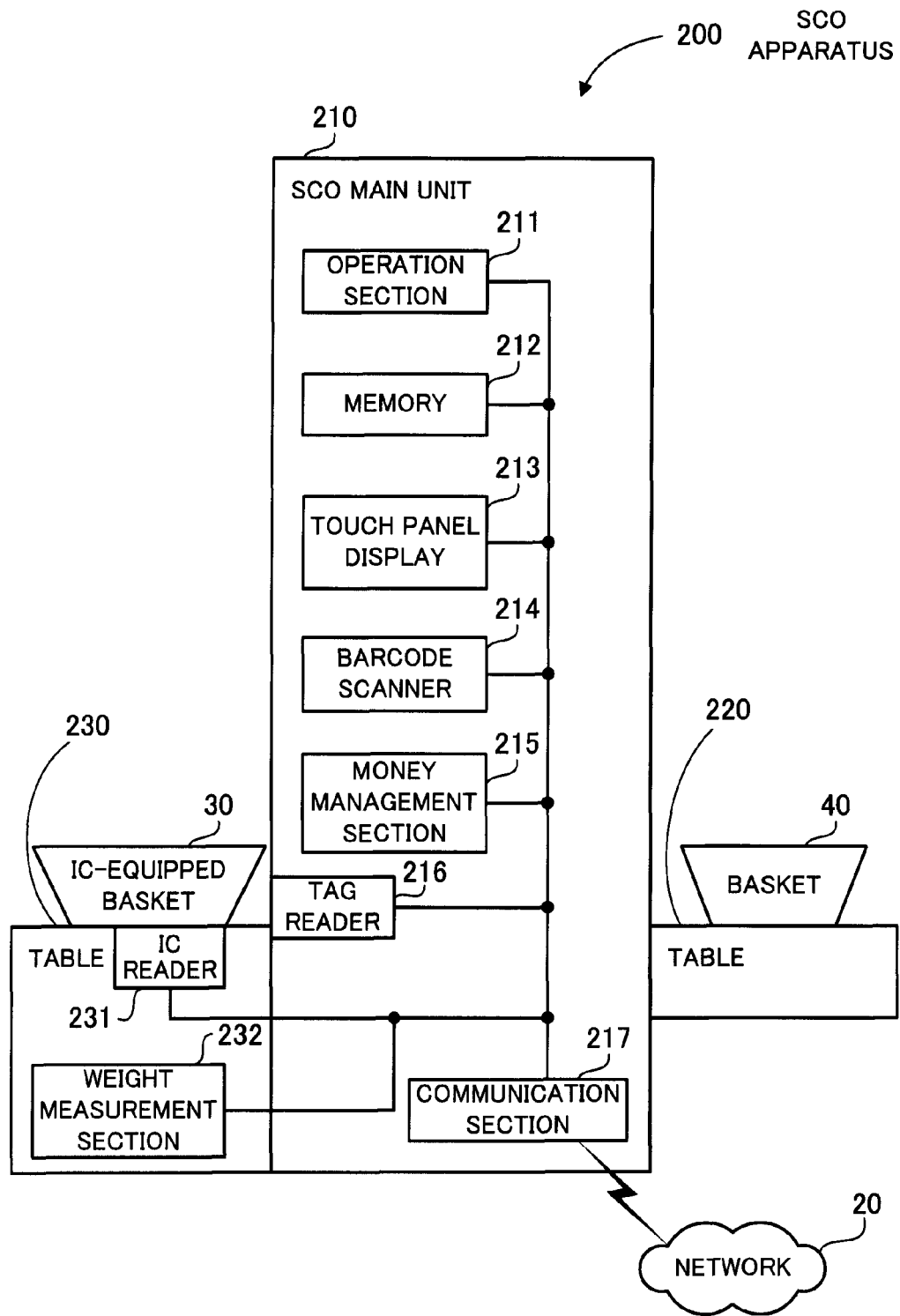
FIG. 7 illustrates a hardware configuration of an SCO apparatus.

FIG. 7 illustrates a hardware configuration of the SCO apparatus 200. The SCO apparatus 200 has an SCO main unit 210, and tables 220 and 230.

The SCO main unit 210 has an operation section 211, a memory 212, a touch panel display 213, a barcode scanner 214, a money management section 215, a tag reader 216, and a communication section 217.

The operation section 211 controls the entire SCO apparatus 200. The operation section 211 outputs to the communication section 217, if desired, the information obtained from each section. The operation section 211 outputs to each section, if desired, the information obtained from the communication section 217.

The memory 212 is a storage area for storing programs or data necessary for processing in the operation section 211.

The touch panel display 213 displays information to the customer 50, and receives an operation input entered by the customer 50. Specifically, the customer 50 performs operations according to an interface displayed on the touch panel display 213. This enables the customer 50 to settle accounts for commodities by an operation of the customer 50 itself.

The barcode scanner 214 irradiates a laser scanning line onto a commodity to read a barcode attached to the commodity. The barcode scanner 214 outputs, to the operation section 211, commodity identification information obtained by reading the barcode. This enables the operation section 211 to obtain information such as a commodity price from the store server 300 via the communication section 217 based on the commodity identification information obtained from the barcode scanner 214.

The money management section 215 performs a money receipt and payment management for coins or bills in the SCO apparatus 200.

The tag reader 216 performs communication with the RFID tag 160 of the IC card 100 of the IC-equipped basket 30 using UHF band electromagnetic waves. The tag reader 216 performs communication with the IC-equipped basket 30 when the customer 50 starts accounting processing, and outputs the processing result to the operation section 211.

The communication section 217 is a communication interface connected with the network 20. The communication section 217 performs data communication with the store server 300 via the network 20.

The table 220 is a table for placing the basket 40 upon settlement of accounts for commodities.

The table 230 is a table for placing the IC-equipped basket 30 upon settlement of accounts for commodities. The table 230 has an IC reader 231 and a weight measurement section 232.

The IC reader 231 performs communication with the IC tag 170 of the IC card 100 of the IC-equipped basket 30 using HF band electromagnetic waves. The IC reader 231 performs, during the accounting processing, reading/writing of electronic money information managed by the IC tag 170.

The weight measurement section 232 measures the weight of the IC-equipped basket 30 and commodities placed on the table 230. The weight measurement section 232 outputs the measurement result to the operation section 211.

Figure 8:
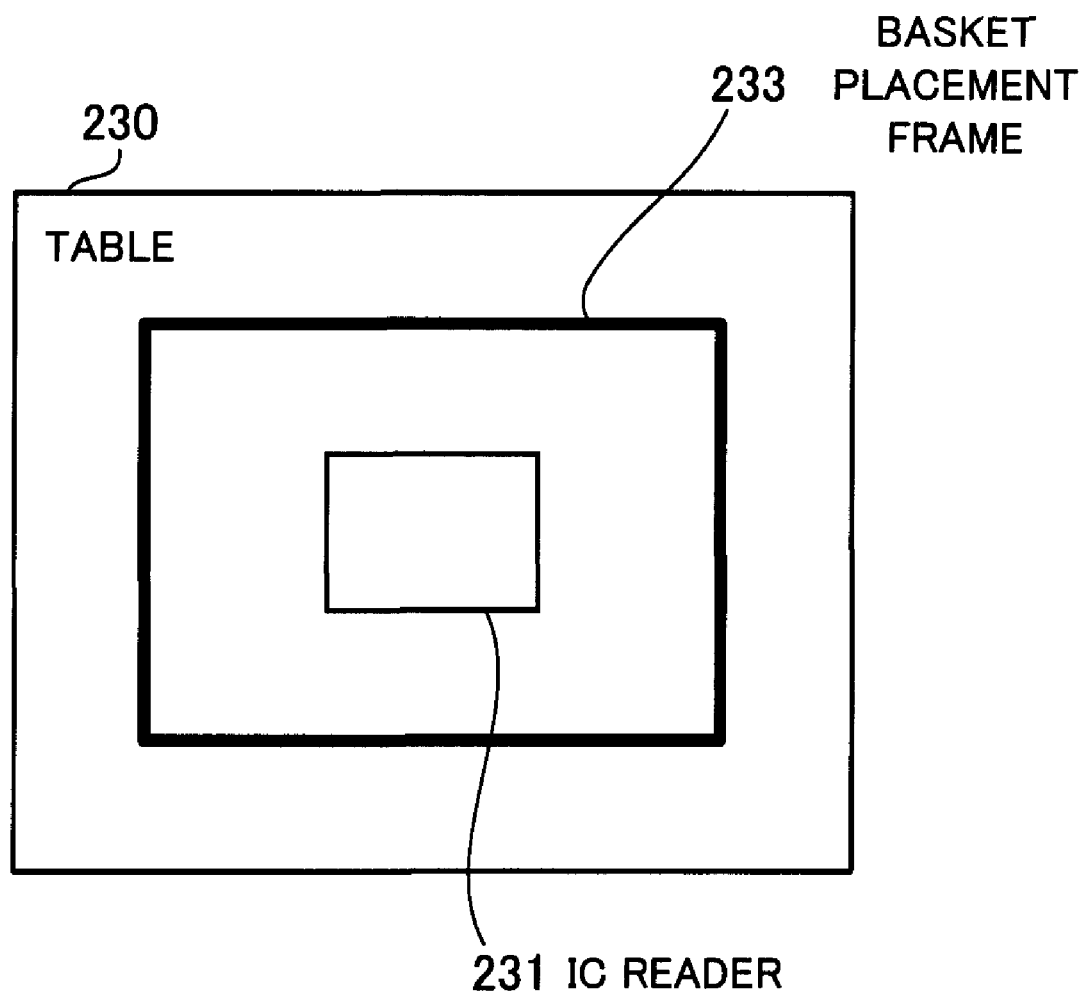
FIG. 8 illustrates a table for placing an IC-equipped basket.

FIG. 8 illustrates a table for placing the IC-equipped basket. FIG. 8 illustrates a top view of the table 230. The table 230 has a basket placement frame 233.

The basket placement frame 233 is provided such that when the IC-equipped basket 30 is placed within the basket placement frame 233, the IC reader 231 is disposed under the IC card 100 of the IC-equipped basket 30. Thus, the placement position of the IC-equipped basket 30 is specified with respect to the customer 50. This enables the IC reader 231 and the IC card 100 to fall within a proper communication distance. At the same time, this enables the tag reader 216 and the IC card 100 to fall within a proper communication distance.

Figure 9:
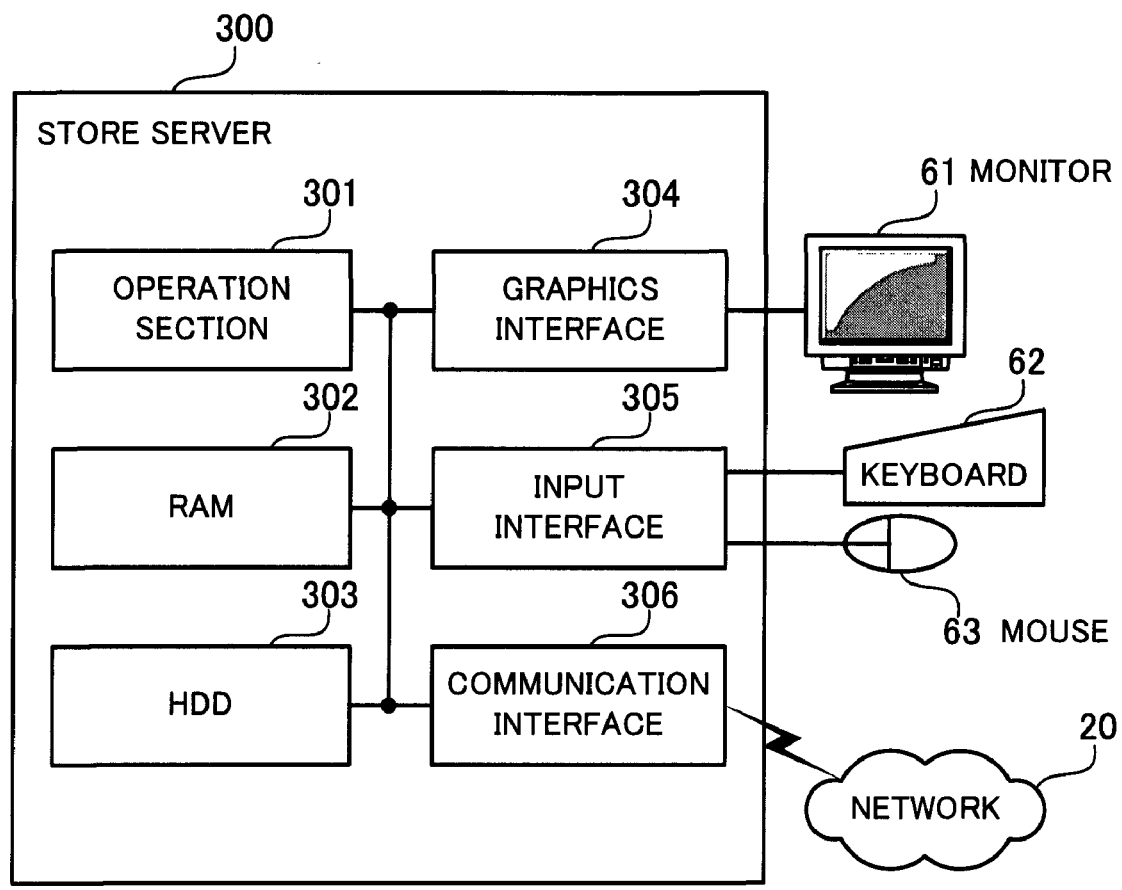
FIG. 9 illustrates a hardware configuration of a store server.

FIG. 9 illustrates a hardware configuration of the store server 300. The entire store server 300 is controlled by the operation section 301. The operation section 301 is connected with a RAM (Random Access Memory) 302, an HDD (Hard Disk Drive) 303, a graphics interface 304, an input interface 305, and a communication interface 306 via a bus.

The RAM 302 temporarily stores at least a part of an OS (Operating System) program or application programs executed by the operation section 301. The RAM 302 also stores various data sets necessary for the processing executed by the operation section 301.

The HDD 303 stores data handled by OS or applications. The HDD 303 stores various data sets necessary for a processing executed by the operation section 301.

The graphics interface 304 is connected with a monitor 61. The graphics interface 304 controls the monitor 61 to display an image on its display according to instructions from the operation section 301.

The input interface 305 is an interface for receiving a data input from an external device. The input interface 305 is connected with a keyboard 62 and a mouse 63. The input interface 305 transmits, to the operation section 301, signals transmitted from the keyboard 62 and the mouse 63.

The communication interface 306 is connected to the network 20. The communication interface 306 exchanges data with the SCO apparatus 200, 200a, 200b, or other devices (POS terminal devices) via the network 20.

Figure 10:
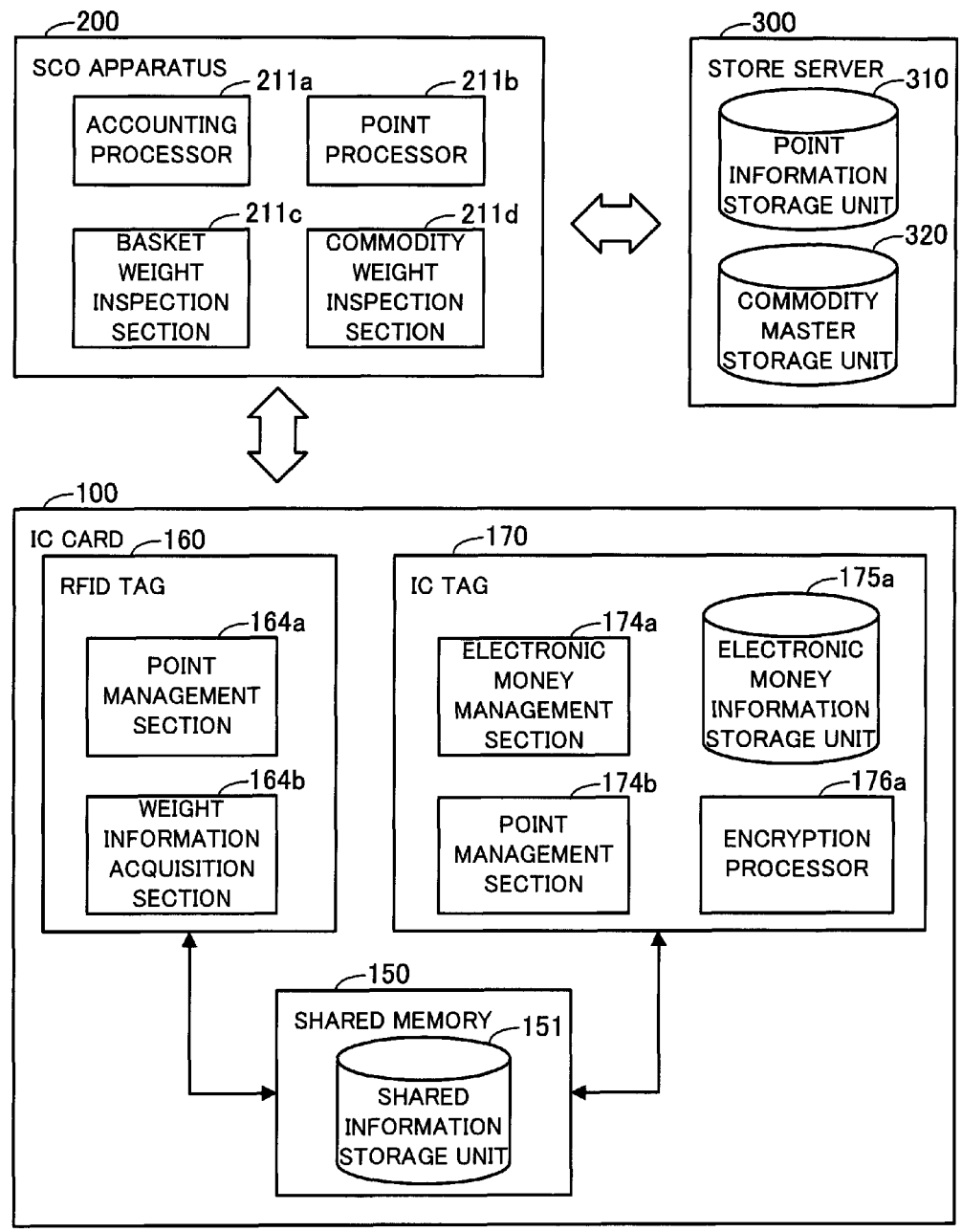
FIG. 10 is a block diagram illustrating functions of respective devices composing an SCO system.

FIG. 10 is a block diagram illustrating functions of the respective devices composing the SCO system. The IC card 100 has the shared memory 150, the RFID tag 160, and the IC tag 170 as described above. These sections realize the respective functions, respectively.

The shared memory 150 has a shared information storage unit 151. The shared information storage unit 151 stores information on the points that are given to the customer 50 based on the use of the IC-equipped basket 30 or information on the weight of the IC-equipped basket 30.

The RFID tag 160 has a point management section 164a and a weight information acquisition section 164b. Functions of the respective sections are realized when the controller 164 executes the programs stored in the NVRAM 165.

The point management section 164a performs, in response to a request from the SCO apparatus 200, reading and updating of the point information stored in the shared information storage unit 151.

The weight information acquisition section 164b obtains information on the weight of the IC-equipped basket 30 from the shared information storage unit 151 and transmits the obtained weight information back to the SCO apparatus 200 in response to a request from the SCO apparatus 200.

The IC tag 170 has an electronic money management section 174a, a point management section 174b, an electronic money information storage unit 175a, and an encryption processor 176a. Functions of the electronic money management section 174a and the point management section 174b are realized when the operation section 174 executes programs stored in the NVRAM 175. Functions of the electronic money information storage unit 175a are realized by the NVRAM 175. Functions of the encryption processor 176a are realized by the encryption controller 176.

The electronic money management section 174a reads an electronic money balance stored in the electronic money information storage unit 175a and performs processing such as charge and reduction in response to a request from the SCO apparatus 200.

The point management section 174b performs, in response to a request from the SCO apparatus 200, reading and updating of the point information stored in the shared information storage unit 151.

The electronic money information storage unit 175a stores the balance of the charged electronic money.

The encryption processor 176a encrypts/decrypts data stored in the electronic money information storage unit 175a.

The SCO apparatus 200 has an accounting processor 211a, a point processor 211b, a basket weight inspection section 211c, and a commodity weight inspection section 211d. Functions of the respective sections are realized when the operation section 211 executes the programs stored in the memory 212.

The accounting processor 211a obtains, from the store server 300, commodity prices input by the customer 50 and calculates a total value of the commodity prices. Then, the accounting processor 211a receives the commodity prices and pays the change. When receiving information on used points from the point processor 211b, the accounting processor 211a subtracts a price corresponding to the received points from the commodity prices.

The point processor 211b transmits a point information acquisition request to the IC card 100 based on the use of the IC-equipped basket 30, and performs predetermined point addition processing on the point information obtained in response to this acquisition request. Then, the point processor 211b transmits a point information updating request to the IC card 100 to update the original point information to the addition-processed point information.

In addition, the point processor 211b transmits, when the customer 50 specifies the use of points by the operation input during the accounting processing, a point information acquisition request to the IC card 100, and performs predetermined point subtraction processing on the point information obtained in response to this acquisition request. Then, the point processor 211b transmits a point information updating request to the IC card 100 to update the original point information to the subtraction-processed point information. Further, the point processor 211b outputs to the accounting processor 211a the points (used points) subtracted at this time.

The basket weight inspection section 211c inspects a weight of the IC-equipped basket 30. Specifically, the basket weight inspection section 211c obtains information on weight of the IC-equipped basket 30 from the IC card 100. Further, the basket weight inspection section 211c obtains a weight measurement result of an empty-state IC-equipped basket 30 measured by the weight measurement section 232, and compares both of the weight information units. This comparison prevents illegal use of the IC-equipped basket 30.

The commodity weight inspection section 211d inspects the weight of the commodities registered in the SCO apparatus 200 and then put in the IC-equipped basket 30. Specifically, the commodity weight inspection section 211d obtains the weight information of the registered commodities from the store server 300. Subsequently, the commodity weight inspection section 211d obtains, from the weight measurement section 232, the weight corresponding to the difference between the previous weight measurement result and the present weight measurement result. Then, the commodity weight inspection section 211d compares both of the weight information units. This comparison prevents commodities different from those actually registered in the SCO apparatus 200 from being put in the IC-equipped basket 30.

The store server 300 has a point information storage unit 310 and a commodity master storage unit 320.

The point information storage unit 310 stores present point information for each customer in association with the customer ID.

The commodity master storage unit 320 stores price or weight information for each commodity in association with barcode information for each commodity.

The store server 300 transmits the information units stored in the point information storage unit 310 or the commodity master storage unit 320 back to the SCO apparatus 200 in response to inquires from the SCO apparatus 200. Further, the store server 300 updates, in response to an updating request from the SCO apparatus 200, the point information stored in the point information storage unit 310.

Figure 11:
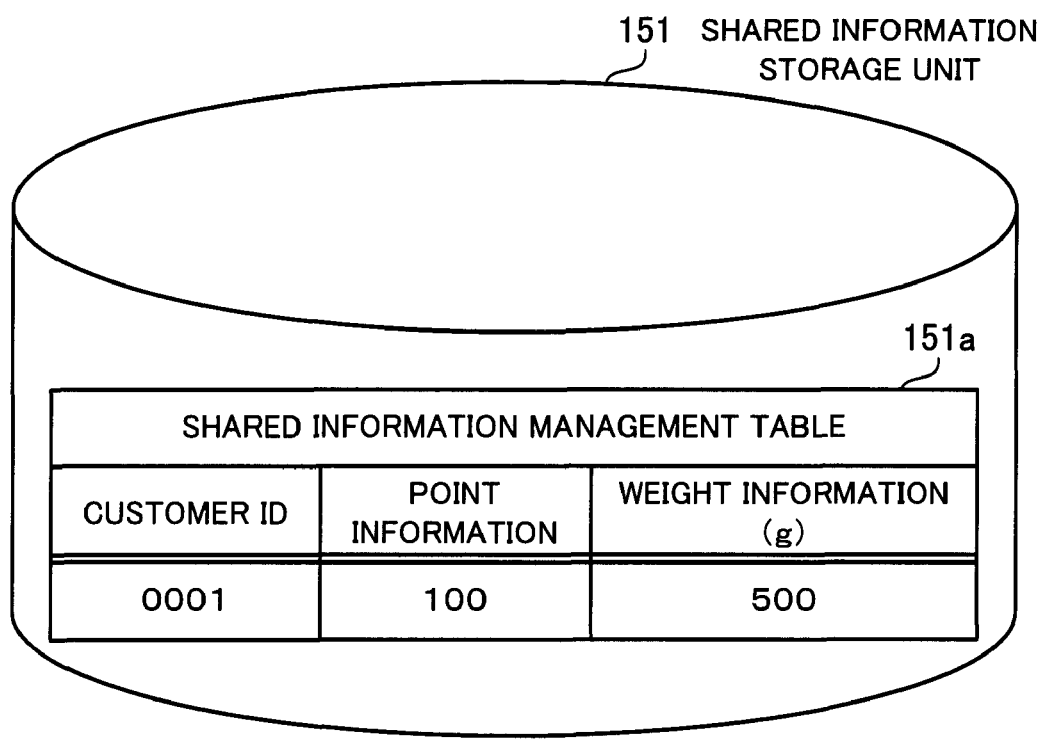
FIG. 11 illustrates a data structure example of a shared information management table.

FIG. 11 illustrates a data structure example of a shared information management table. A shared information management table 151a is stored in the shared information storage unit 151. The shared information management table 151a has an item indicating the customer ID, an item indicating the point information, and an item indicating the weight information. Information units of the respective items arranged in the lateral direction are associated with each other to compose information relating to one shared information unit.

The item indicating the customer ID has ID information given to the customer. The item indicating the point information has a point given to each customer based on the use of the IC-equipped basket 30. The item indicating the weight information has information indicating the weight of the IC-equipped basket 30.

The shared information management table 151a has such information units that the customer ID is "0001", the point information is "100" and the weight information is "500(g)".

Next, processing realized by the SCO system having the above-described configuration will be described in detail.

Figure 12:
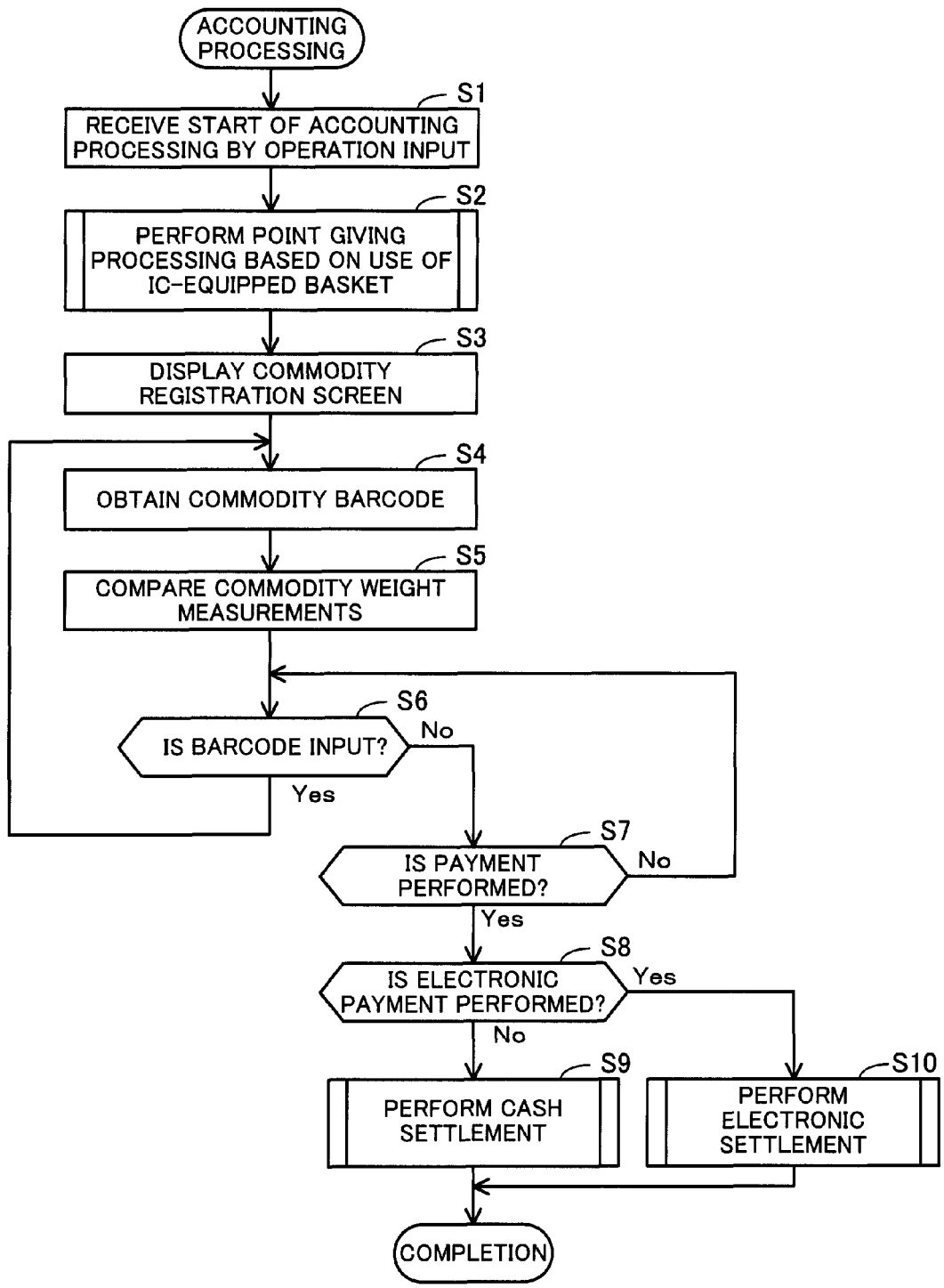
FIG. 12 is a flowchart illustrating a procedure of an accounting processing in an SCO apparatus.

FIG. 12 is a flowchart illustrating a procedure of accounting processing in the SCO apparatus 200. Hereinafter, the processing illustrated in FIG. 12 will be described along step numbers.

Step S1: The accounting processor 211a receives a message that the customer 50 starts the accounting processing by a predetermined operation input to the touch panel display 213. At this time, the customer 50 places the IC-equipped basket 30 within the basket placement frame 233 of the table 230.

Step S2: The accounting processor 211a performs processing for giving points based on the use of the IC-equipped basket 30.

Step S3: The accounting processor 211a displays a commodity registration screen on the touch panel display 213 and urges the customer 50 to register commodities using the barcode scanner 214.

Step S4: The accounting processor 211a obtains barcode information read by the barcode scanner 214. The accounting processor 211a obtains the weight of a commodity corresponding to the barcode information from the commodity master storage unit 320 of the store server 300 and outputs the commodity weight to the commodity weight inspection section 211*d*.

Step S5: The commodity weight inspection section 211*d* measures the weight of a commodity put in the IC-equipped basket 30, and compares the commodity weight with that obtained from the accounting processor 211*a*. At this time, only when the weight measured values agree with each other within a predetermined error range, commodity registration is performed by the accounting processor 211*a*. When the weight measured values disagree with each other, a weight error is detected and as a result, no commodity registration is performed.

Step S6: The accounting processor 211*a* determines whether a barcode is input. If YES, the process returns to step S4. If NO, the process goes to step S7.

Step S7: The accounting processor 211*a* determines whether to receive a message that the customer 50 performs payment by a predetermined operation input to the touch panel display 213. If YES, the process goes to step S8. If NO, the process returns to step S6.

Step S8: The accounting processor 211*a* determines whether to receive a message that the customer 50 performs electronic payment by a predetermined operation input to the touch panel display 213. If NO, the process goes to step S9. If YES, the process goes to step S10.

Step S9: The accounting processor 211*a* performs cash settlement of accounts and the processing is completed.

Step S10: The accounting processor 211*a* performs electronic settlement of accounts and the processing is completed.

Thus, the SCO apparatus 200 gives the customer 50 points based on the use of the IC-equipped basket 30. The customer 50 uses the given points. As a result, the customer 50 can enjoy a service that makes it possible to reduce commodity prices.

The processing between the IC card 100 and the SCO apparatus 200 at the steps S2, S9, and S10 will be described in detail below.

At first, the processing for giving points based on the use of my basket at step S2 of FIG. 12 will be described in detail below.

Figure 13:
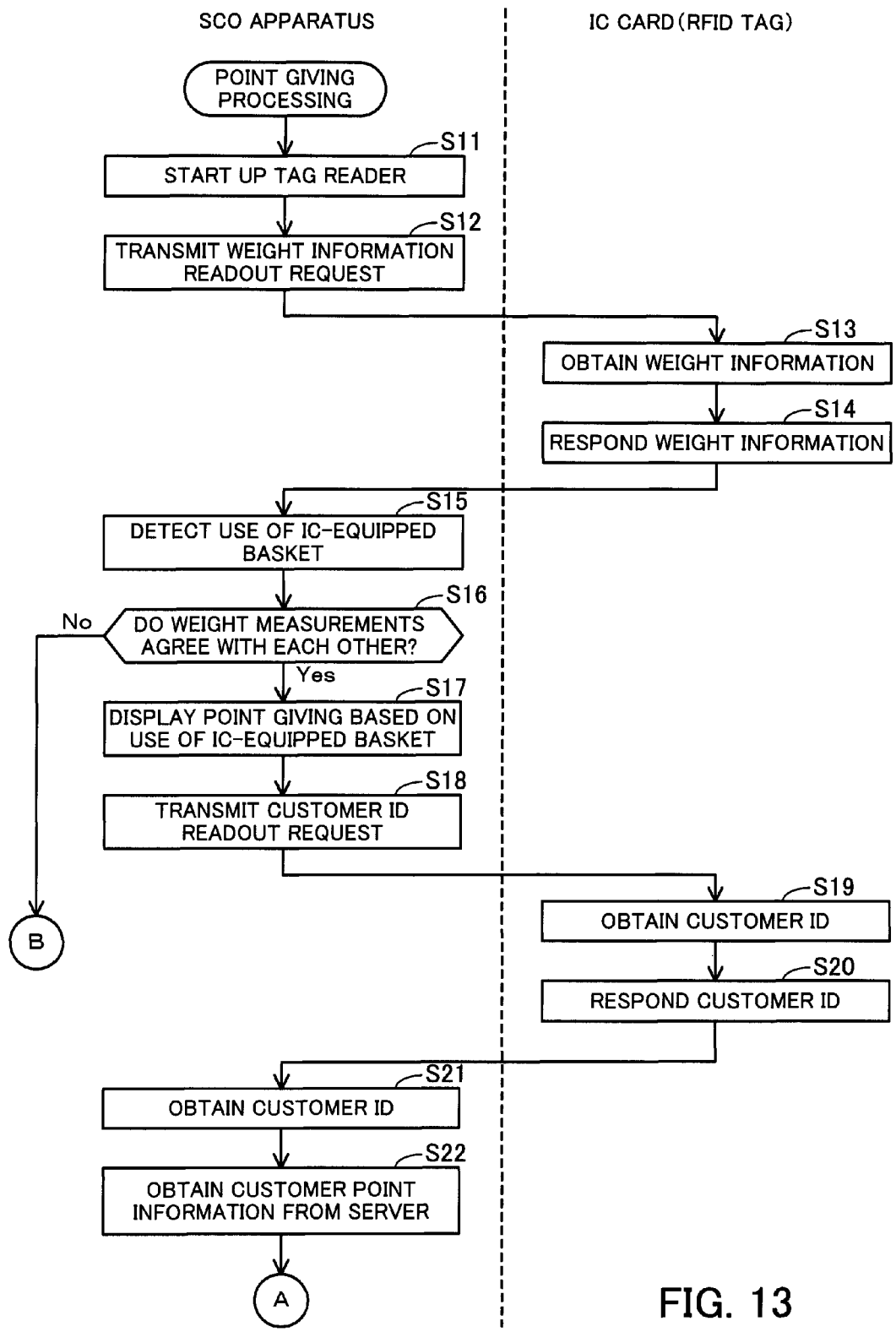
FIG. 13 is a first flowchart illustrating a procedure of a point giving processing.

FIG. 13 is a first flowchart illustrating a procedure of the point giving processing. Hereinafter, the processing illustrated in FIG. 13 will be described along the step numbers. The following processes will describe in detail the processing illustrated at step S2 of FIG. 12.

Step S11: The accounting processor 211*a* starts up the tag reader 216.

Step S12: The basket weight inspection section 211*c* transmits a weight information readout request to the RFID tag 160 of the IC card 100 via the tag reader 216.

Step S13: The weight information acquisition section 164*b* obtains, in response to the weight information readout request obtained from the SCO apparatus 200, the weight information from the shared information management table 151*a* stored in the shared information storage unit 151.

Step S14: The weight information acquisition section 164*b* transmits the obtained weight information back to the SCO apparatus 200.

Step S15: The basket weight inspection section 211*c* obtains the weight information of the IC-equipped basket 30 from the IC card 100 via the tag reader 216. When the weight information is obtained, the use of the IC-equipped basket 30 can be detected. In other words, when the weight information fails to be obtained, nonuse of the IC-equipped basket 30 is determined. Further, the basket weight inspection section 211*c* obtains the weight measurement result of an empty-state IC-equipped basket 30 measured by the weight measurement section 232.

Step S16: The basket weight inspection section 211*c* compares the weight information of the IC-equipped basket 30 obtained from the IC card 100 and that of the empty-state IC-equipped basket 30 measured by the weight measurement section 232. Then, the basket weight inspection section 211*c* determines whether both of the weight information units agree with each other within a predetermined error range. If YES, the basket weight inspection section 211*c* resets a scale of the weight measurement section 232, and the process goes to step S17. If NO, the process goes to step S34 of FIG. 14.

Step S17: The point processor 211*b* displays on the touch panel display 213 a message that points are given based on the use of the IC-equipped basket 30.

Step S18: The point processor 211*b* transmits a customer ID readout request to the RFID tag 160 of the IC card 100 via the tag reader 216.

Step S19: The point management section 164*a* obtains, in response to the customer ID readout request obtained from the SCO apparatus 200, a customer ID from the shared information management table 151*a* stored in the shared information storage unit 151.

Step S20: The point management section 164*a* transmits the obtained customer ID back to the SCO apparatus 200.

Step S21: The point processor 211*b* receives the customer ID from the IC card 100 via the tag reader 216.

Step S22: The point processor 211*b* receives the present point information corresponding to the relevant customer ID from the point information storage unit 310 of the store server 300.

Figure 14:
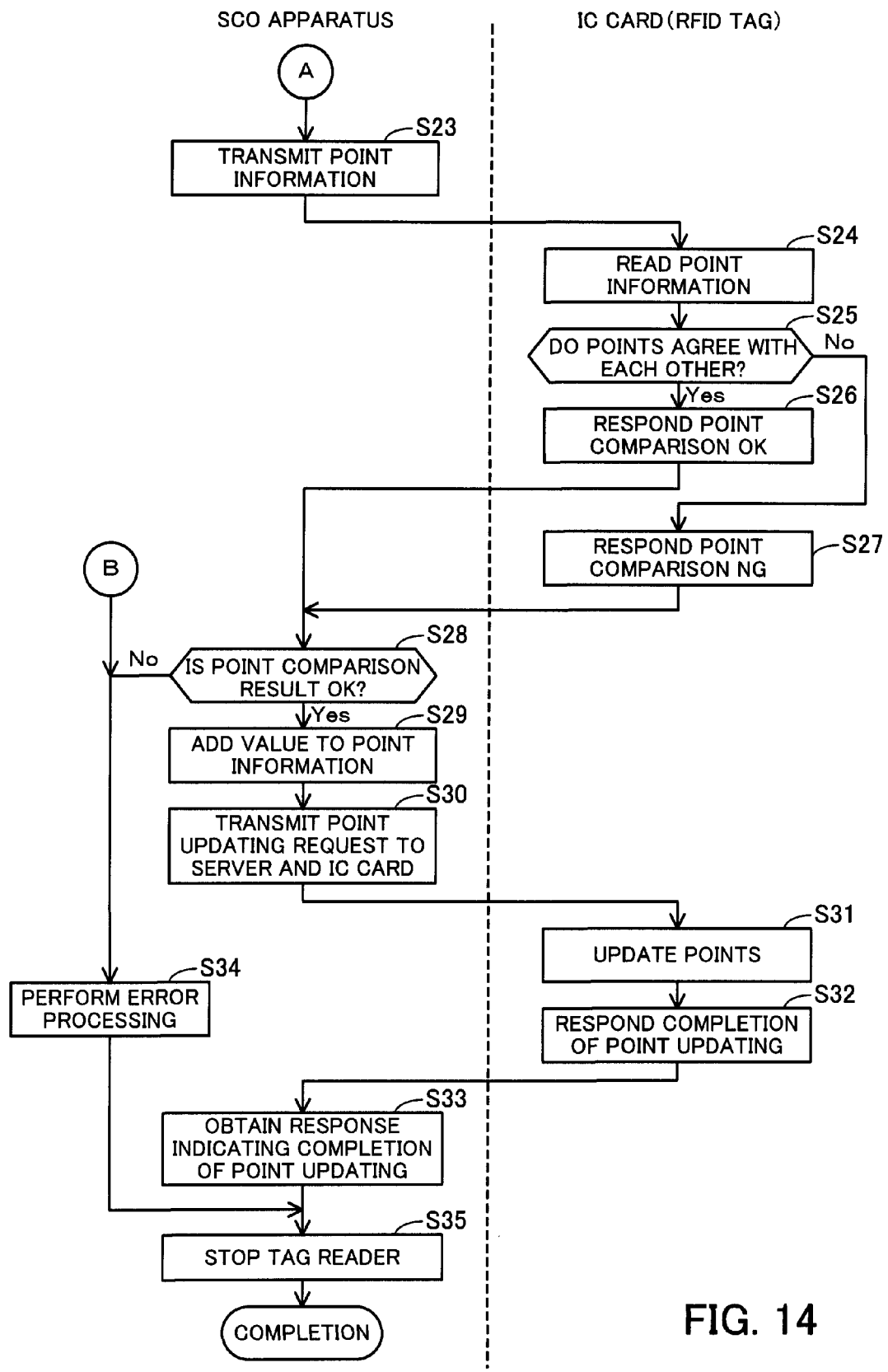
FIG. 14 is a second flowchart illustrating a procedure of a point giving processing.

FIG. 14 is a second flowchart illustrating a procedure of the point giving processing. Hereinafter, the processing illustrated in FIG. 14 will be described along the step numbers. The following processes are performed subsequent to the processing illustrated in FIG. 13.

Step S23: The point processor 211*b* transmits the point information obtained from the store server 300 to the RFID tag 160 of the IC card 100 via the tag reader 216.

Step S24: The point management section 164*a* obtains the present point information from the SCO apparatus 200. The point management section 164*a* obtains the point information from the shared information management table 151*a* stored in the shared information storage unit 151.

Step S25: The point management section 164*a* determines whether the point information obtained from the SCO apparatus 200 agrees with that obtained from the shared information management table 151*a*. If YES, the process goes to step S26. If NO, the process goes to step S27.

Step S26: The point management section 164*a* transmits to the SCO apparatus 200 a message that both of the point information units agree with each other (the point comparison result is OK).

Step S27: The point management section 164*a* transmits to the SCO apparatus 200 a message that both of the point information units disagree with each other (the point comparison result is NG).

Step S28: The point processor 211*b* obtains a point comparison result from the IC card 100 via the tag reader 216. Then, the point processor 211*b* determines whether the point comparison result is OK or NG. If YES, the process goes to step S29. If NO, the process goes to step S34.

Step S29: The point processor 211*b* adds a predetermined value as the point given based on the use of the IC-equipped basket 30 to the point information obtained at step S22 of FIG. 13.

Step S30: The point processor 211b transmits an updating request to the store server 300 to update the original point information to the point information obtained at step S29. In response to this updating request, the store server 300 updates the relevant customer point information stored in the point information storage unit 310. Further, the point processor 211b transmits another point information updating request to the RFID tag 160 of the IC card 100 via the tag reader 216.

Step S31: The point management section 164a updates, in response to the point information updating request obtained from the SCO apparatus 200, the point information of the shared information management table 151a stored in the shared information storage unit 151.

Step S32: The point management section 164a transmits to the SCO apparatus 200 a response message indicating that the point information update processing is completed.

Step S33: The point processor 211b obtains a response message indicating the completion of the point information update processing from the IC card 100 via the tag reader 216.

Step S34: The accounting processor 211a detects an error (the point comparison result is NG) in the point processor 211b or an error (both of the basket weight information units disagree with each other) in the basket weight inspection section 211c, and performs error processing. The error processing may be performed, for example, by notifying a store clerk of detected errors to urge the store clerk to cope with the errors individually. As a result of coping with the errors individually, the errors are eliminated and points are given to the customer 50. Thereafter, the process goes to step S35.

Step S35: The accounting processor 211a stops the tag reader 216, and the processing is completed.

Thus, the SCO apparatus 200 performs communication with the IC card 100. As a result, the SCO apparatus 200 can automatically detect the use of the IC-equipped basket 30. This automatic detection prevents occurrence of such a trouble that a store clerk fully checks the use of the IC-equipped basket 30 of the customer 50, and therefore makes it possible to effectively perform the point operation.

The SCO apparatus 200 compares the weight information read from the IC card 100 and the actually measured weight information when being able to perform communication with the IC card 100. This comparison makes it possible to prevent a problem that the accounting processing is performed in a state where commodities not yet registered are put in the IC-equipped basket 30.

The SCO apparatus 200 adds a predetermined value as a point when detecting the use of the IC-equipped basket 30. Then, the IC card 100 updates the point information stored in the IC card 100 to the addition-processed point information. The store server 300 updates the relevant customer point information stored in the store server 300 to the addition-processed point information. Thus, the point information managed by the IC card 100 and that managed by the store server 300 are synchronized with each other. As a result, reliability in the point management can be improved.

Next, cash settlement processing at step S9 of FIG. 12 will be described.

Figure 15:
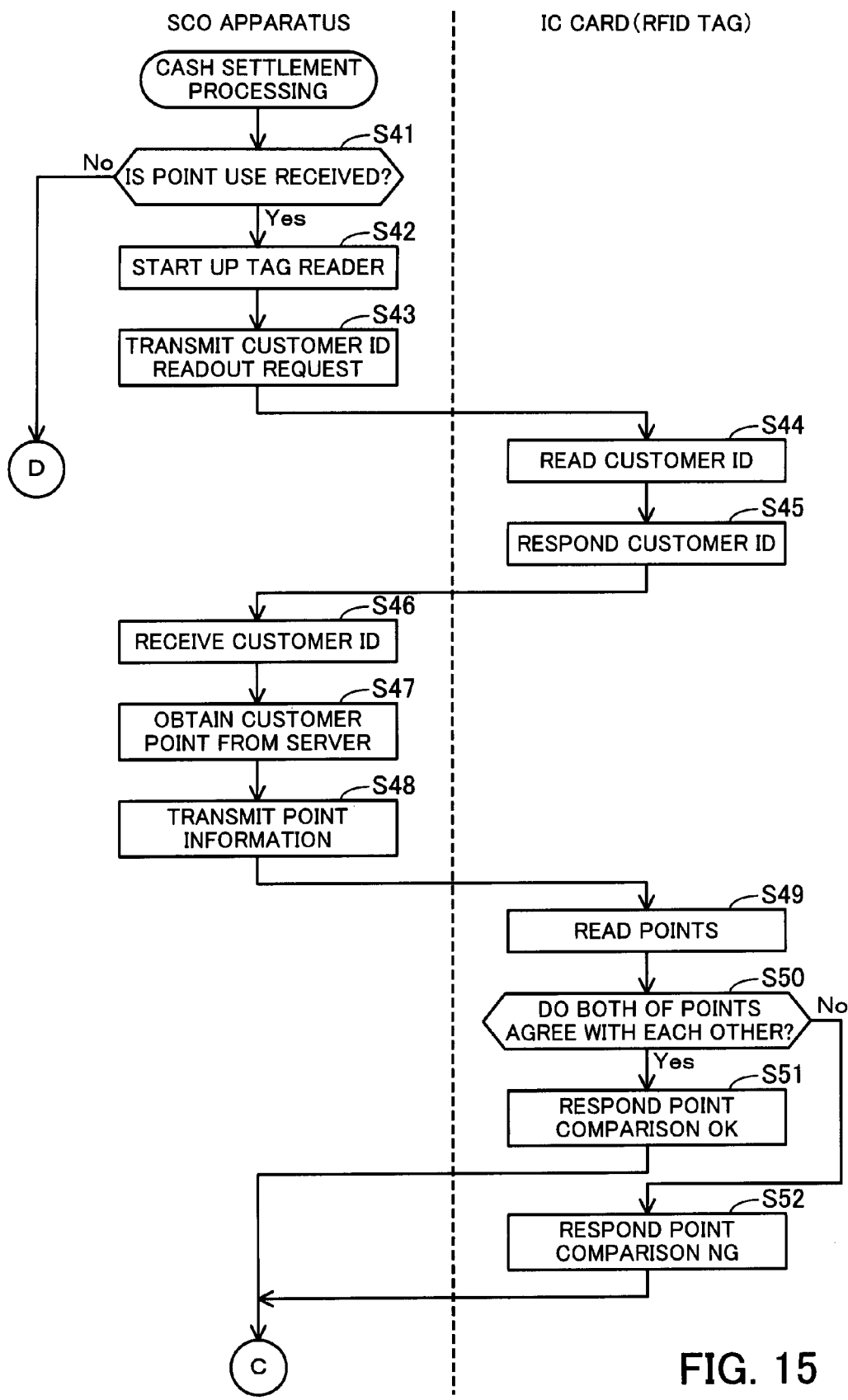
FIG. 15 is a first flowchart illustrating a procedure of a cash settlement processing.

FIG. 15 is a first flowchart illustrating a procedure of the cash settlement processing. Hereinafter, the processing illustrated in FIG. 15 will be described along the step numbers. The following processes will describe in detail the processing at step S9 of FIG. 12.

Step S41: The accounting processor 211a determines whether to receive a message that the customer 50 uses points by a predetermined operation input to the touch panel display 213. If YES, the process goes to step S42. If NO, the process goes to step S59 of FIG. 16.

Step S42: The accounting processor 211a starts up the tag reader 216.

Step S43: The point processor 211b transmits a customer ID readout request to the RFID tag 160 of the IC card 100 via the tag reader 216.

Step S44: The point management section 164a obtains, in response to the customer ID readout request obtained from the SCO apparatus 200, a customer ID from the shared information management table 151a stored in the shared information storage unit 151.

Step S45: The point management section 164a transmits the obtained customer ID back to the SCO apparatus 200.

Step S46: The point processor 211b obtains the customer ID from the IC card 100 via the tag reader 216.

Step S47: The point processor 211b obtains the present point information corresponding to the relevant customer ID from the point information storage unit 310 of the store server 300.

Step S48: The point processor 211b transmits the point information obtained from the store server 300 to the RFID tag 160 of the IC card 100 via the tag reader 216.

Step S49: The point management section 164a obtains the point information from the shared information management table 151a stored in the shared information storage unit 151.

Step S50: The point management section 164a determines whether the point information obtained from the SCO apparatus 200 agrees with that obtained from the shared information management table 151a. If YES, the process goes to step S51. If NO, the process goes to step S52.

Step S51: The point management section 164a transmits to the SCO apparatus 200 a message that both of the point information units agree with each other (the point comparison result is OK).

Step S52: The point management section 164a transmits to the SCO apparatus 200 a message that both of the point information units disagree with each other (the point comparison result is NG).

Figure 16:
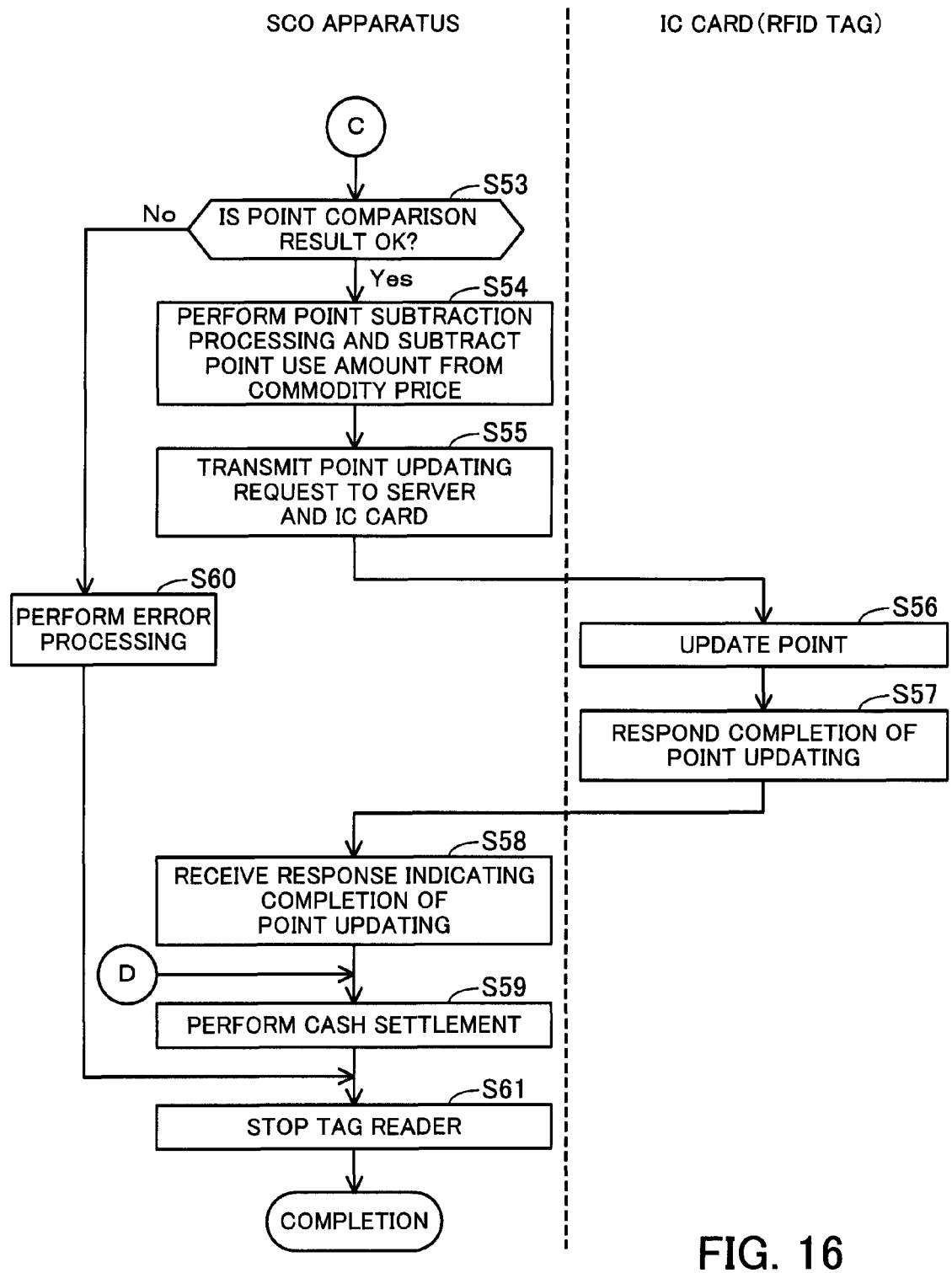
FIG. 16 is a second flowchart illustrating a procedure of a cash settlement processing.

FIG. 16 is a second flowchart illustrating a procedure of the cash settlement processing. Hereinafter, the processing illustrated in FIG. 16 will be described along the step numbers. The following processes are performed subsequent to the processing illustrated in FIG. 15.

Step S53: The point processor 211b obtains a point comparison result from the IC card 100 via the tag reader 216. Then, the point processor 211b determines whether the point comparison result is OK or NG. If YES, the process goes to step S54. If NO, the process goes to step S60.

Step S54: The point processor 211b performs predetermined point subtraction processing on the point information obtained at step S47 of FIG. 15. Then, the accounting processor 211a subtracts from the commodity prices a price corresponding to the use of points.

Step S55: The point processor 211b transmits an updating request to the store server 300 to update the original point information to the point information obtained at step S54. In response to this updating request, the store server 300 updates the relevant customer point information stored in the point information storage unit 310. Further, the point processor 211b transmits another point information updating request to the RFID tag 160 of the IC card 100 via the tag reader 216.

Step S56: The point management section 164a updates, in response to the point information updating request obtained from the SCO apparatus 200, the point information of the shared information management table 151a stored in the shared information storage unit 151.

Step S57: The point management section 164a transmits to the SCO apparatus 200 a response message indicating that the point information update processing is completed.

Step S58: The point processor 211b obtains a response message indicating the completion of the point information update processing from the IC card 100 via the tag reader 216.

Step S59: The accounting processor 211a performs cash settlement of accounts.

Step S60: The accounting processor 211a detects an error (the point comparison result is NG) in the point processor 211b, and performs error processing. The error processing may be performed, for example, by notifying a store clerk of detected errors to urge the store clerk to cope with the errors individually. As a result of coping with the errors individually, the errors are eliminated and the settlement of accounts for commodities is completed. Thereafter, the process goes to step S61.

Step S61: The accounting processor 211a stops the tag reader 216, and the processing is completed.

Thus, in the case of cash payment, the SCO apparatus 200 performs the reading/updating of the point information through the communication with the RFID tag 160, and subtracts a price corresponding to the used points from the commodity price.

Next, the electronic settlement processing at step S10 of FIG. 12 will be described.

Figure 17:
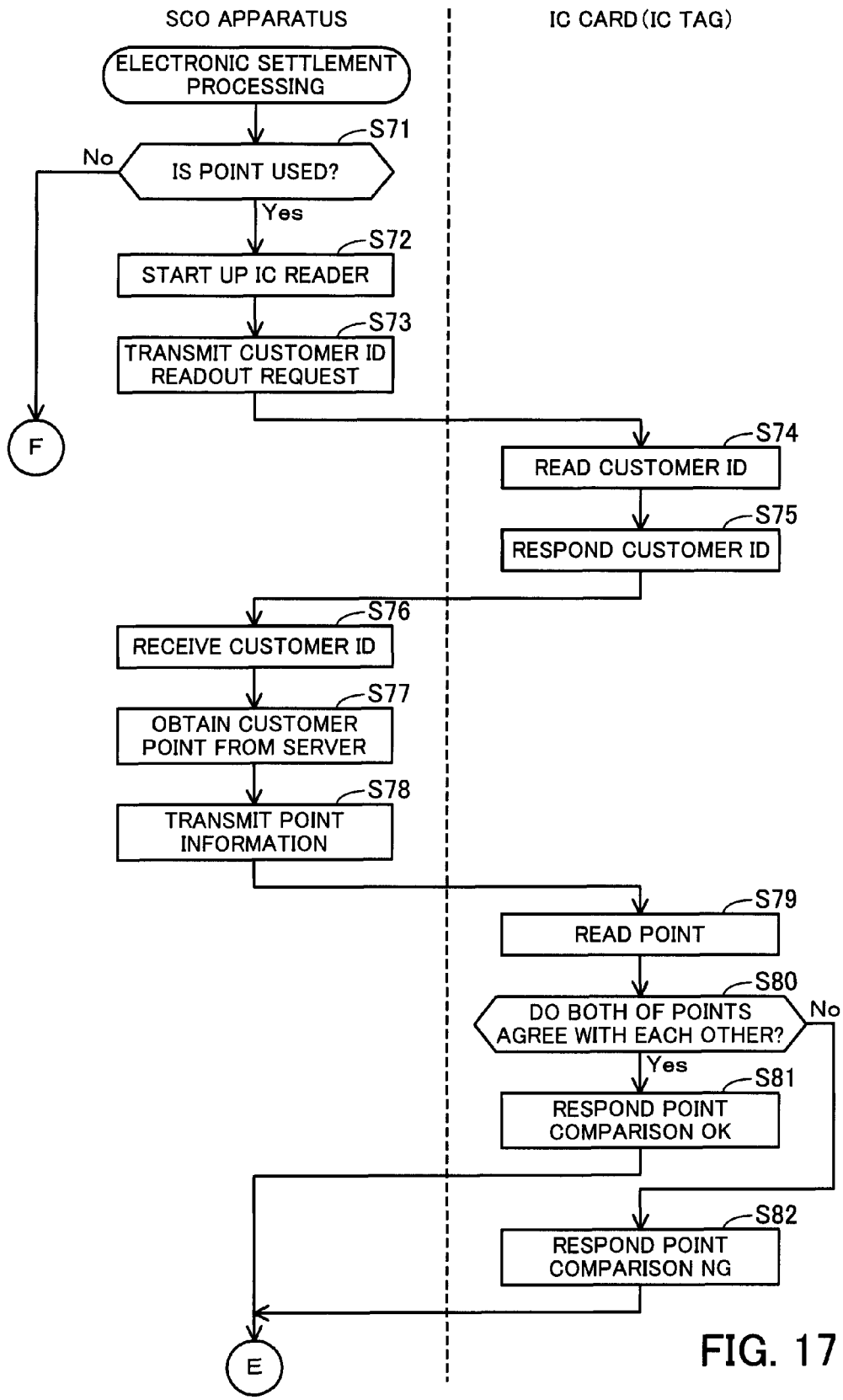
FIG. 17 is a first flowchart illustrating a procedure of an electronic settlement processing.

FIG. 17 is a first flowchart illustrating a procedure of the electronic settlement processing. Hereinafter, the processing illustrated in FIG. 17 will be described along the step numbers. The following processes will describe in detail the processing at step S10 of FIG. 12.

Step S71: The accounting processor 211a determines whether to receive a message that the customer 50 uses points by a predetermined operation input to the touch panel display 213. If YES, the process goes to step S72. If NO, the process goes to step S89 of FIG. 18.

Step S72: The accounting processor 211a starts up the IC reader 231.

Step S73: The point processor 211b transmits a customer ID readout request to the IC tag 170 of the IC card 100 via the IC reader 231.

Step S74: The point management section 174b obtains in response to the customer ID readout request obtained from the SCO apparatus 200, a customer ID from the shared information management table 151a stored in the shared information storage unit 151.

Step S75: The point management section 174b transmits the obtained customer ID back to the SCO apparatus 200.

Step S76: The point processor 211b obtains the customer ID from the IC card 100 via the IC reader 231.

Step S77: The point processor 211b obtains the present point information corresponding to the relevant customer ID from the point information storage unit 310 of the store server 300.

Step S78: The point processor 211b transmits the point information obtained from the store server 300 to the IC tag 170 of the IC card 100 via the IC reader 231.

Step S79: The point management section 174b obtains the point information from the shared information management table 151a stored in the shared information storage unit 151.

Step S80: The point management section 174b determines whether the point information obtained from the SCO apparatus 200 agrees with that obtained from the shared information management table 151a. If YES, the process goes to step S81. If NO, the process goes to step S82.

Step S81: The point management section 174b transmits to the SCO apparatus 200 a message that both of the point information units agree with each other (the point comparison result is OK).

Step S82: The point management section 174b transmits to the SCO apparatus 200 a message that both of the point information units disagree with each other (the point comparison result is NG).

Figure 18:
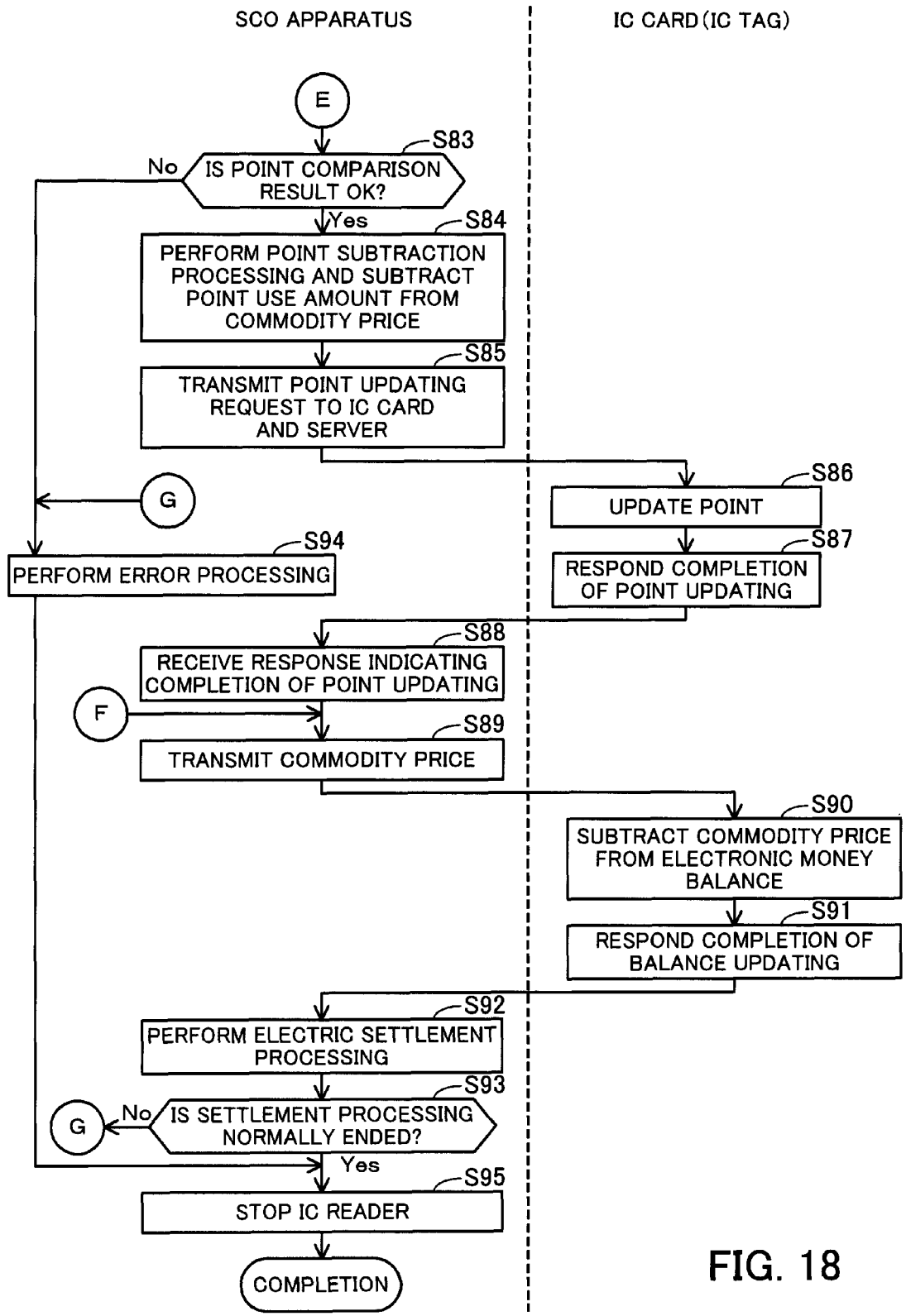
FIG. 18 is a second flowchart illustrating a procedure of an electronic settlement processing.

FIG. 18 is a second flowchart illustrating a procedure of the electronic settlement processing. Hereinafter, the processing illustrated in FIG. 18 will be described along the step numbers. The following processes are performed subsequent to the processing illustrated in FIG. 17.

Step S83: The point processor 211b obtains a point comparison result from the IC card 100 via the IC reader 231. Then, the point processor 211b determines whether the point comparison result is OK or NG. If YES, the process goes to step S84. If NO, the process goes to step S94.

Step S84: The point processor 211b performs predetermined point subtraction processing on the point information obtained at step S77 of FIG. 17. Then, the accounting processor 211a subtracts from the commodity prices a price corresponding to the use of points.

Step S85: The point processor 211b transmits an updating request to the store server 300 to update the original point information to the point information obtained at step S84. In response to this updating request, the store server 300 updates the relevant customer point information stored in the point information storage unit 310. Further, the point processor 211b transmits another point information updating request to the IC tag 170 of the IC card 100 via the IC reader 231.

Step S86: The point management section 174b updates, in response to the point information updating request obtained from the SCO apparatus 200, the point information of the shared information management table 151a stored in the shared information storage unit 151.

Step S87: The point management section 174b transmits to the SCO apparatus 200 a response message indicating that the point information update processing is completed.

Step S88: The point processor 211b obtains a response message indicating the completion of the point information update processing from the IC card 100 via the IC reader 231.

Step S89: The accounting processor 211a transmits the commodity price to the IC card 100 via the IC reader 231.

Step S90: The electronic management section 174a subtracts the commodity price from an electronic money balance stored in the electronic money information storage unit 175a. When the electronic management section 174a reads the electronic money balance, since the electronic money information stored in the electronic money information storage unit 175a is encrypted, the encryption processor 176a decrypts the electronic money information. When the electronic money management section 174a writes the electronic money information in the electronic money information storage unit 175a, the encryption processor 176a encrypts the electronic money information having been subjected to balance update processing.

Step S91: The electronic money management section 174a transmits to the SCO apparatus 200 a response message indicating that the electric money balance update processing is completed.

Step S92: The accounting processor 211a performs the electronic settlement processing in cooperation with a settlement processing center (not shown in FIG. 2) that performs the electronic settlement.

Step S93: The accounting processor 211*a* determines whether the settlement processing is normally ended. If YES, the process goes to step S95. If NO, the process goes to step S94.

Step S94: The accounting processor 211*a* detects an error (the point comparison result is NG) in the point processor 211*b* or an electronic settlement processing error, and performs error processing. The error processing may be performed, for example, by notifying a store clerk of detected errors to urge the store clerk to cope with the errors individually. As a result of coping with the errors individually, the errors are eliminated and the settlement of accounts for commodities is completed. Thereafter, the process goes to step S95.

Step S95: The accounting processor 211*a* stops the IC reader 231, and the processing is completed.

Thus, in the case of electronic payment, the SCO apparatus 200 performs the reading/updating of the point information through the communication with the IC tag 170, and subtracts a price corresponding to the used points from the commodity price. Further, the SCO apparatus 200 performs electronic settlement of accounts through the communication with the IC tag 170.

As described above, when a communication between the IC card 100 and the SCO apparatus 200 is performed using electromagnetic waves in different frequency bands, different services are provided such as (a) cash settlement and point use and (b) electronic settlement and point use. The service (a) needs no security or needs only to secure a certain amount of security in a communication path or data management. Meanwhile, the service (b) needs to secure high security because of accompanying the electronic settlement.

Therefore, the above-described service (a) is provided using the RFID tag 160 that has a simplified function and performs communication using the UHF band electromagnetic waves having a long communicable distance. The service (b) is provided using the IC tag 170 that has an operation function and an encryption control function and performs communication using the HF band electromagnetic waves having a short communicable distance.

Thus, when a plurality of communication paths are properly used according to requirements of the security, a system capable of satisfying both of the convenience and security can be realized.

The SCO apparatus 200 can automatically detect the use of the IC-equipped basket 30 via the communication with the RFID tag 160 of the IC card 100. This automatic detection prevents occurrence of such a trouble that a store clerk fully checks the use of the IC-equipped basket 30 of the customer 50, and therefore makes it possible to effectively perform the point operation.

When using the IC-equipped basket 30, the customer 50 can simply perform the settlement in electronic money charged in the IC card 100. This makes it possible to improve the accounting processing efficiency of the customer 50 and to attain congestion reduction at the SCO apparatus 200.

The present embodiment has been described assuming that the points are given based on the use of the IC-equipped basket 30. However, the present embodiment is not limited thereto. It is also considered that the points are given under other conditions.

In the communication between the IC card 100 and the SCO apparatus 200, the RFID tag 160 and the IC tag 170 can perform communication with the tag reader 216 and the IC reader 231, respectively. Accordingly, there is the possibility that while one RF tag has already performed communication, another RF tag starts communication. For example, while the RFID tag 160 has already started communication and the shared memory 150 has been driven, the IC tag 170 starts communication. Further, it is considered that both of the RF tags start communication at the same time.

In the above-described cases, it is preferred in view of circuit protection that the power controller 140 performs the following control. That is, the power controller 140 generates the power for the shared memory 150 using any one of the UHF and HF band electromagnetic waves or generates the power for the shared memory 150 using both of the UHF and HF band electromagnetic waves.

Therefore, when the power controller 140 selects the electromagnetic waves used as a power source of the shared memory 150, it is considered to set, for example, any one of the following priorities (control methods) of (1) to (3).

When both of the RF tags are in a communication state, power for the shared memory 150 is generated using electromagnetic waves having a higher power level.

When both of the RF tags are in a communication state, power for the shared memory 150 is continually generated to drive the shared memory 150 using the previously received electromagnetic waves, and power supply to the shared memory 150 using the subsequently received electromagnetic waves is not performed.

When both of the RF tags are in a communication state, power for the shared memory 150 is generated using the electromagnetic waves received by both of the RF tags.

In addition, the power controller 140 performs the following control. In the above-described priorities (1) to (3), when the communication using one electromagnetic wave used for the power supply to the shared memory 150 is completed and the communication using the other electromagnetic wave is continuously performed, power for the shared memory 150 is generated using the continuously received electromagnetic wave.

Next, a specific example of a method of mounting the IC card 100 in the IC-equipped basket 30 will be described.

Figure 19A:
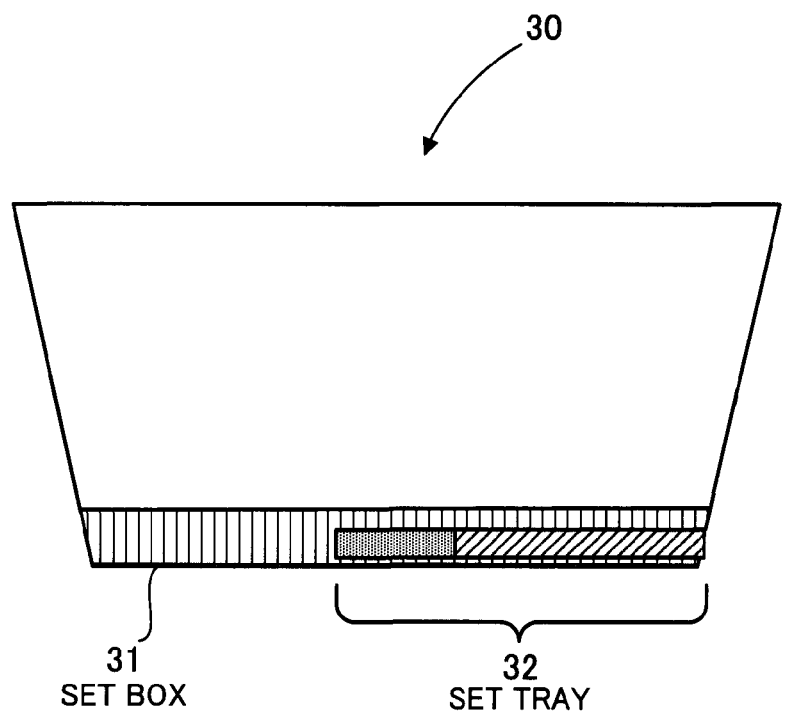
FIGS. 19A and 19B illustrate a structure example of a bottom part of an IC-equipped basket.
Figure 19B:
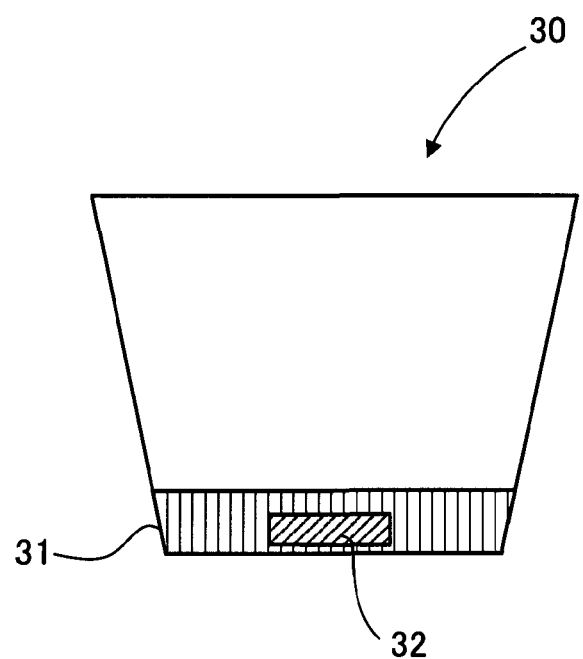

FIGS. 19A and 19B illustrate a structure example of a bottom portion of the IC-equipped basket 30. FIG. 19A illustrates a side view of the IC-equipped basket 30, and FIG. 19B illustrates a front view of the IC-equipped basket 30. The IC-equipped basket 30 has a set box 31 and a set tray 32. Note, however, that the set tray 32 illustrated in FIG. 19A is invisible because of being actually hidden by the set box 31; however, the set tray 32 is illustrated for convenience of explanation.

The set box 31 is a holding member for installing and holding the set tray 32 on a bottom face of the IC-equipped basket 30. The set box 31 has an insertion slot for inserting the set tray 32 from the front side, and the set tray 32 is inserted into and held by the insertion slot.

The set tray 32 is a member for holding the IC card 100. By further inserting and holding the IC card 100 into and by the set tray 32, the IC card 100 is mounted in the IC-equipped basket 30. The set tray 32 has a card holder for holding the IC card 100 on one base end. The set tray 32 is disposed at a position (at almost a center of the bottom face of the IC-equipped basket 30) suitable for communication with the SCO apparatus 200 when being inserted into the set box 31 from the base end having the card holder.

Figure 20A:
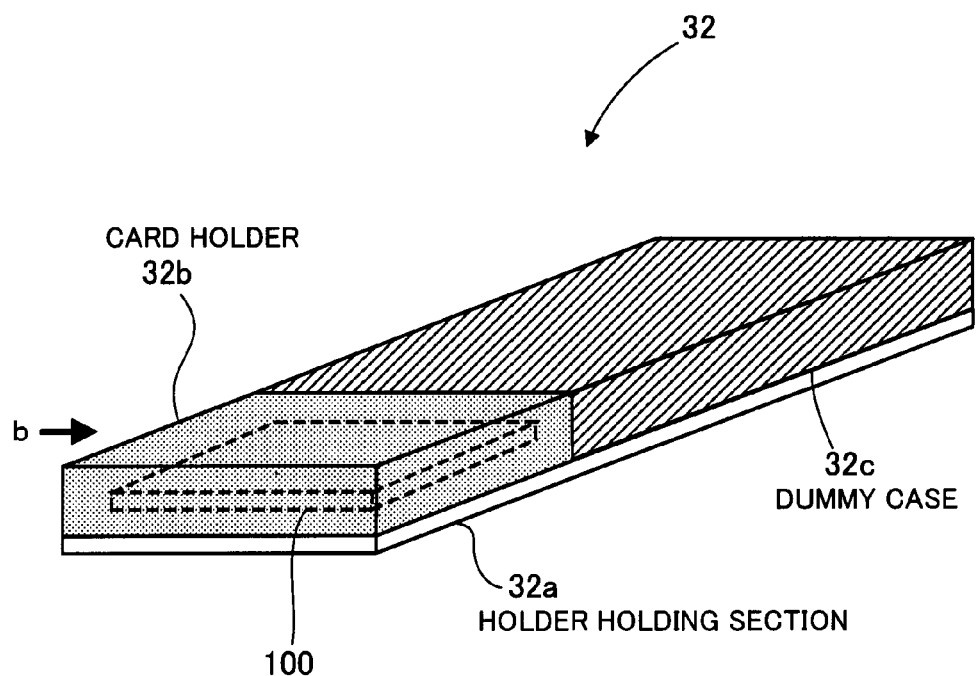
FIGS. 20A and 20B illustrate a structure example of a set tray.
Figure 20B:
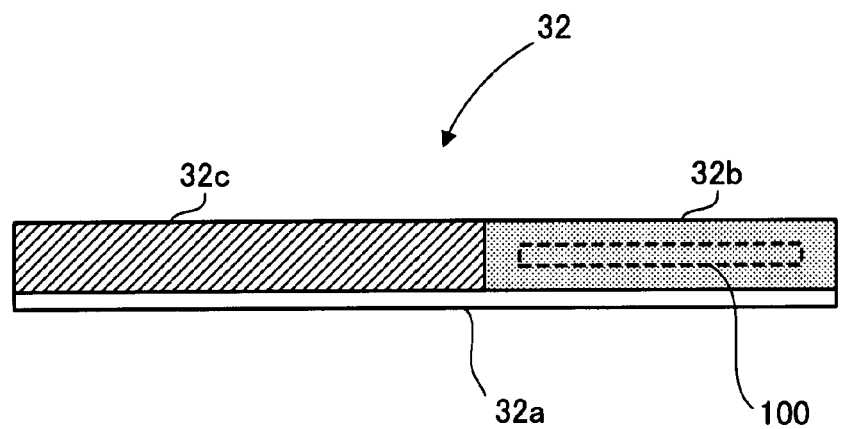

FIGS. 20A and 20B illustrate a structure example of the set tray 32. FIG. 20A illustrates a perspective view of the set tray 32, and FIG. 20B illustrates a side view of the set tray 32 viewed from the "b" direction of FIG. 20A.

The set tray 32 has a holder holding section 32*a*, a card holder 32*b*, and a dummy case 32*c*.

The holder holding section 32a is a member for mounting and holding the card holder 32b and the dummy case 32c.

The card holder 32b is a member for inserting and holding the IC card 100. The card holder 32b is attachable and detachable to and from the holder holding section 32a. FIGS. 20A and 20B illustrate the IC card 100 held by the card holder 32b (actually invisible).

The dummy case 32c is provided to guide the card holder 32b to the center of the bottom face of the IC-equipped basket 30 when inserting the set tray 32 into the IC-equipped basket 30.

Thus, the IC card 100 is configured to be detachable from the IC-equipped basket 30. Therefore, even when a basket portion (including the set box 31) of the IC-equipped basket 30 for putting commodities is broken, this configuration makes it possible to cope with this problem by replacing only the basket portion.

Figure 21:
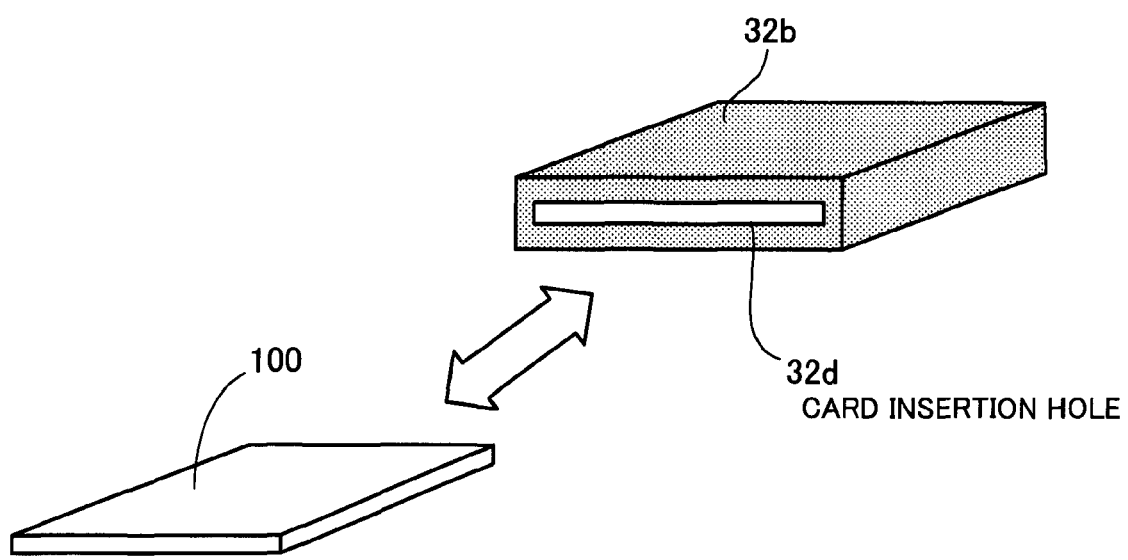
FIG. 21 illustrates a card holder.

FIG. 21 illustrates the card holder 32b. The card holder 32b has a card insertion slot 32d for inserting the IC card 100. When the IC card 100 is inserted into the card insertion slot 32d, the card holder 32b contains the IC card 100.

Here, the card holder 32b is formed by dielectric with a predetermined dielectric constant. The dielectric to be selected is dielectric having a dielectric constant such that a communicable distance of each of the RF tags of the IC card 100 is extended to an appropriate distance by impedance matching in the communication with the SCO apparatus 200. Specifically, dielectric having a dielectric constant of approximately 3 to 8 may be used for extending the communicable distance to an appropriate distance. In the present example, the communicable distance via the antenna 120 is set to several tens of centimeters for enabling the IC card 100 and the SCO apparatus 200 to normally perform communication.

The communicable distance of the IC card 100 in the case of using no card holder 32b is short (e.g., approximately several centimeters) as compared with the case of using the card holder 32b. Therefore, the IC card 100 held as a single body is excellent in preventing eavesdropping and has high security. Specifically, the IC card 100 separated from the IC-equipped basket 30 and used as a single body is also suitable for the communication requiring high security, such as electronic settlement.

Figure 22:
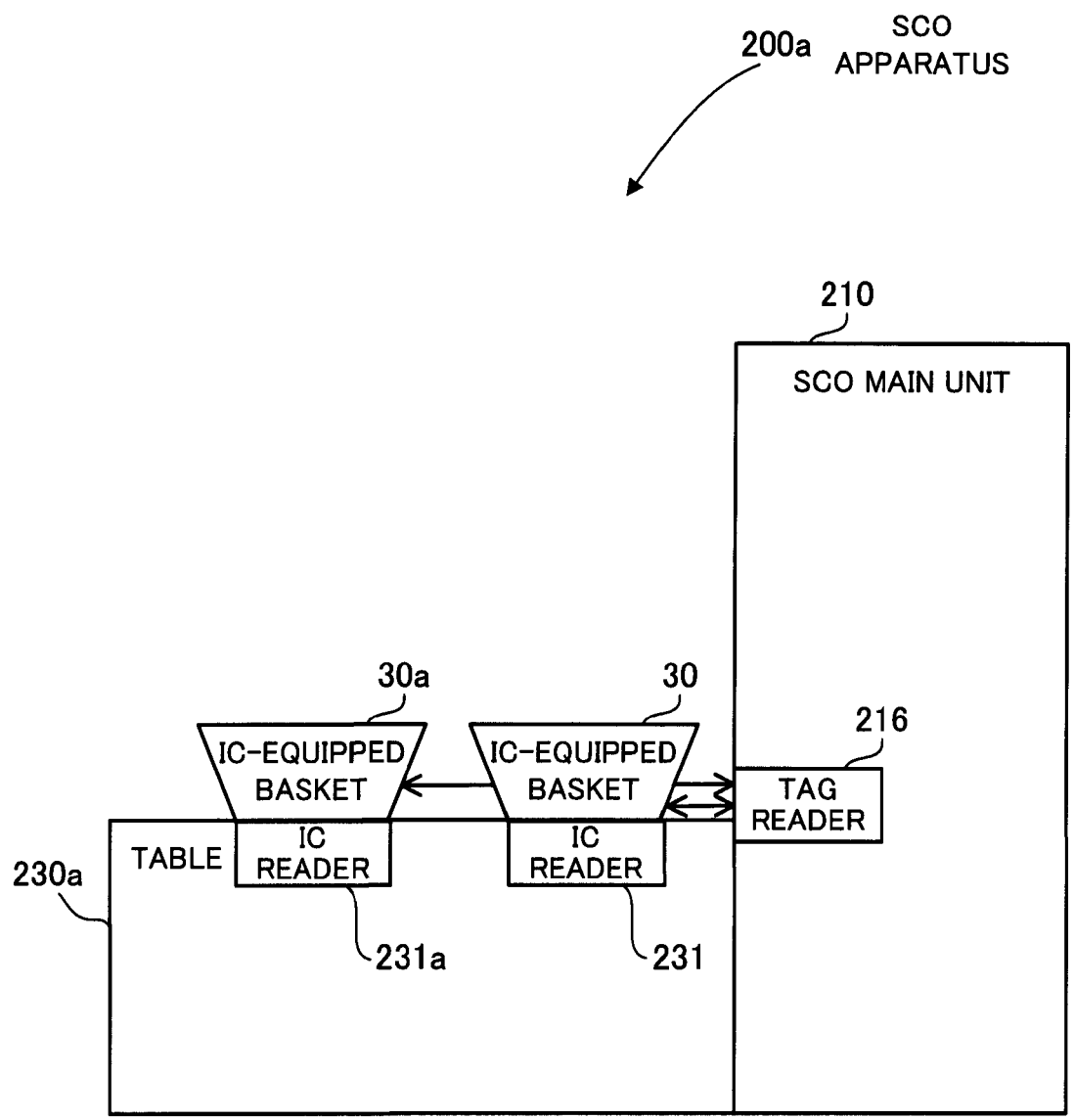
FIG. 22 illustrates a communication distance between an IC-equipped basket and an SCO apparatus.

FIG. 22 illustrates a communication distance between the IC-equipped basket and the SCO apparatus. The SCO apparatus 200a has the SCO main unit 210 and a table 230a (the table 220 is not shown).

The table 230a corresponds to the table 230 of FIG. 7.

The table 230a is a table capable of placing the IC-equipped baskets 30 and 30a at the same time. The table 230a has the IC readers 231 and 231a.

The IC readers 231 and 231a perform communication with the respective IC tags of the IC-equipped baskets 30 and 30a, respectively. The respective RFID tags of the IC-equipped baskets 30 and 30a perform communication with the tag reader 216.

Here, it is considered that when the IC-equipped baskets 30 and 30a are placed at the same time, for example, a distance between the IC-equipped basket 30a and the tag reader 216 is longer than that between the IC-equipped basket 30 and the tag reader 216. That is, it is assumed that the communicable distance of the UHF band communication of the IC card 100 needs to be changed between a case where a single basket is placed and a case where a plurality of baskets are placed.

In response to the above request, when appropriately selecting the dielectric of the card holder 32b for holding the IC card 100, the communicable distance of the IC card 100 can be adjusted. Thus, when the communicable distance is adjusted on the card holder 32b side according to the system operation, the versatility of the IC card 100 can be improved.

According to the above-described communication apparatus, communication system, and power control method, even when a plurality of passive RF tags each performing communication using different frequency bands are used in combination, data can be shared among the RF tags.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that various changes, substitutions and alterations could be made hereto without departing from the spirit and scope of the invention.

What is claimed is:

1. A communication apparatus comprising:
   a first RF tag which performs communication using electromagnetic waves in a first frequency band;
   a second RF tag which performs communication using electromagnetic waves in a second frequency band different from those in the first frequency band;
   a storage unit having a shared area accessible from the first and second RF tags; and
   a power controller which generates power for driving the first RF tag and the storage unit using the first frequency band electromagnetic waves and supplies the generated power to the first RF tag and the storage unit, and which generates power for driving the second RF tag and the storage unit using the second frequency band electromagnetic waves and supplies the generated power to the second RF tag and the storage unit.

2. The communication apparatus according to claim 1, further comprising:
   a dipole antenna for transmitting and receiving the first frequency band electromagnetic waves; and
   a coil antenna for transmitting and receiving the second frequency band electromagnetic waves; wherein:
   the power controller generates, when receiving the first frequency band electromagnetic waves, power for driving the first RF tag and the storage unit using power received by the dipole antenna, and generates, when receiving the second frequency band electromagnetic waves, power for driving the second RF tag and the storage unit using power induced by electromagnetic induction via the coil antenna.

3. The communication apparatus according to claim 1, wherein:
   the first RF tag performs communication using electromagnetic waves in UHF band; and
   the second RF tag performs communication using electromagnetic waves in HF band.

4. The communication apparatus according to claim 1, wherein:
   the power controller generates, when simultaneously receiving the first frequency band electromagnetic waves and the second frequency band electromagnetic waves, power for driving the storage unit using electromagnetic waves specified according to a predetermined priority from among the respective electromagnetic waves or using both of the electromagnetic waves.

5. A communication system comprising:
a first communication apparatus including:
- a first RF tag which performs communication using electromagnetic waves in a first frequency band,
- a second RF tag which performs communication using electromagnetic waves in a second frequency band different from those in the first frequency band,
- a storage unit having a shared area accessible from the first and second RF tags, and
- a power controller which generates power for driving the first RF tag and the storage unit using the first frequency band electromagnetic waves and supplies the generated power to the first RF tag and the storage unit, and which generates power for driving the second RF tag and the storage unit using the second frequency band electromagnetic waves and supplies the generated power to the second RF tag and the storage unit; and a second communication apparatus including:
- a first communication section which transmits to the first communication apparatus the first frequency band electromagnetic waves containing information for processing to be performed by the first RF tag, and
- a second communication section which transmits to the first communication apparatus the second frequency band electromagnetic waves containing information for processing to be performed by the second RF tag.

6. The communication system according to claim 5, wherein:
the first communication apparatus further includes:
- a dipole antenna for transmitting and receiving the first frequency band electromagnetic waves, and
- a coil antenna for transmitting and receiving the second frequency band electromagnetic waves; and
the power controller generates, when receiving the first frequency band electromagnetic waves, power for driving the first RF tag and the storage unit using power received by the dipole antenna, and generates, when receiving the second frequency band electromagnetic waves, power for driving the second RF tag and the storage unit using power induced by electromagnetic induction via the coil antenna.

7. The communication system according to claim 5, wherein:
the first RF tag and the first communication section perform communication using electromagnetic waves in UHF band; and
the second RF tag and the second communication section perform communication using electromagnetic waves in HF band.

8. The communication system according to claim 5, wherein:
the power controller generates, when simultaneously receiving the first frequency band electromagnetic waves and the second frequency band electromagnetic waves, power for driving the storage unit using electromagnetic waves specified according to a predetermined priority from among the respective electromagnetic waves or using both of the electromagnetic waves.

9. The communication system according to claim 5, wherein:
the first communication apparatus is mounted in a predetermined basket for allowing a customer to put commodities to be purchased; and
the second communication apparatus is mounted in a self checkout apparatus including a placement section for placing the predetermined basket so as to communicate with the first communication apparatus and an accounting section for allowing the customer to settle accounts for the commodities by an operation of the customer itself.

10. A method of controlling power of a communication apparatus, comprising:
generating, when the communication apparatus receives electromagnetic waves in a first frequency band, power for driving a first RF tag and a storage unit using the first frequency band electromagnetic waves and supplying the generated power to the first RF tag and the storage unit, the first RF tag performing communication using the first frequency band electromagnetic waves, the storage unit having a shared area accessible from the first RF tag and the second RF tag, and the second RF tag performing communication using electromagnetic waves in a second frequency band different from those in the first frequency band; and
generating, when the communication apparatus receives electromagnetic waves in a second frequency band, power for driving the second RF tag and the storage unit using the second frequency band electromagnetic waves and supplying the generated power to the second RF tag and the storage unit.

* * * * *